US012318795B2

(12) United States Patent
Shultz et al.

(10) Patent No.: US 12,318,795 B2
(45) **Date of Patent: *Jun. 3, 2025**

(54) SPRAY GUN FOR SPRAYING PAINTS AND OTHER COATINGS

(71) Applicant: Graco Minnesota Inc., Minneapolis, MN (US)

(72) Inventors: Mark D. Shultz, Fridley, MN (US); Steven D. Becker, Inver Grove Heights, MN (US); Brian M. Mulgrew, St. Francis, MN (US); Tyler F. Sterner, Champlin, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,198

(22) Filed: Aug. 30, 2023

(65) Prior Publication Data

US 2023/0405624 A1 Dec. 21, 2023

Related U.S. Application Data

(63) Continuation of application No. 17/119,179, filed on Dec. 11, 2020, now Pat. No. 11,772,117.

(Continued)

(51) Int. Cl.

*B05B 9/01* (2006.01)
*B05B 12/00* (2018.01)
*B05B 15/14* (2018.01)

(52) U.S. Cl.

CPC ................ *B05B 15/14* (2018.02); *B05B 9/01* (2013.01); *B05B 12/002* (2013.01)

(58) Field of Classification Search

CPC .......... B05B 12/002; B05B 15/14; B05B 9/01

(Continued)

(56) References Cited

U.S. PATENT DOCUMENTS 3,137,880 A * 6/1964 Kubit ...................... B05C 17/00 15/210.1
3,353,203 A * 11/1967 Ginter .................... A46B 11/00 15/244.1

(Continued)

FOREIGN PATENT DOCUMENTS

CN 201697544 U 1/2011
CN 202893575 U 4/2013

(Continued)

OTHER PUBLICATIONS

Second Communication Pursuant to Article 94(3) EPC for EP Application No. 20216884.5, Dated Jan. 24, 2024, pp. 7.

(Continued)

*Primary Examiner* — Chee-Chong Lee

(74) *Attorney, Agent, or Firm* — Kinney & Lange, P.A.

(57) ABSTRACT

A spray gun includes a gun body and a handle removably connected to the gun body. A filter is disposed in the handle for filtering particulate from the spray fluid. A trigger guard is connected to the handle and gun body and includes a contour on a lower portion of the trigger guard for receiving one or more fingers of the user that are not interfacing with and contacting the trigger. The trigger guard can be disconnected from the gun body and rotated relative to the handle. The trigger guard can contact a portion of the handle and exert torque on the handle to connect the handle to and disconnect the handle from the gun body. The portion of the handle at least partially covers a fitting connecting to the handle to provide spray fluid to the spray gun.

20 Claims, 10 Drawing Sheets

Related U.S. Application Data

(60) Provisional application No. 62/955,894, filed on Dec. 31, 2019.

(58) Field of Classification Search
USPC ........................................................ 239/11
See application file for complete search history.

(56) References Cited

U.S. PATENT DOCUMENTS

| | | | | |
|---|---|---|---|---|
| 3,633,828 | A | 1/1972 | Larson | |
| 3,711,028 | A | 1/1973 | Hengesbach | |
| 3,754,709 | A | 8/1973 | Laatsch | |
| 3,861,695 | A | 1/1975 | Shourek et al. | |
| 3,876,154 | A | 4/1975 | Griebel | |
| 4,083,497 | A | 4/1978 | Rosenberger | |
| 4,166,579 | A | 9/1979 | Beise et al. | |
| 4,651,929 | A | 3/1987 | Kraenzle | |
| 4,676,437 | A | 6/1987 | Brown | |
| 4,709,859 | A | 12/1987 | Schulze et al. | |
| 4,776,517 | A | 10/1988 | Heren | |
| 4,880,166 | A | 11/1989 | Suttner | |
| 5,176,327 | A | 1/1993 | Petersen et al. | |
| 5,370,314 | A * | 12/1994 | Gebauer | B05B 9/01 239/526 |
| D356,855 | S | 3/1995 | Zimmermann et al. | |
| 5,423,348 | A | 6/1995 | Jezek et al. | |
| D376,637 | S | 12/1996 | Kieffer et al. | |
| 5,699,967 | A | 12/1997 | Conatser et al. | |
| D405,503 | S | 2/1999 | Endo | |
| D457,599 | S | 5/2002 | Karwoski et al. | |
| 6,817,728 | B2 | 11/2004 | Goko | |
| D545,943 | S | 7/2007 | Rodgers et al. | |
| 7,243,771 | B2 | 7/2007 | Shanahan | |
| D575,374 | S | 8/2008 | Huang | |
| D578,603 | S | 10/2008 | Khaitov | |
| D588,231 | S | 3/2009 | Pellin et al. | |
| D607,086 | S | 12/2009 | Kosaka | |
| D649,221 | S | 11/2011 | Sinders et al. | |
| D672,012 | S | 12/2012 | Brose et al. | |
| D704,300 | S | 5/2014 | Li et al. | |
| D725,743 | S | 3/2015 | Richter et al. | |
| D727,466 | S | 4/2015 | Richter et al. | |
| 9,192,952 | B2 | 11/2015 | Becker et al. | |
| D757,216 | S | 5/2016 | Gehrung | |
| D758,538 | S | 6/2016 | Tullney et al. | |
| 9,433,953 | B2 | 9/2016 | Ghesla et al. | |
| D770,593 | S | 11/2016 | Gehrung et al. | |
| D778,405 | S | 2/2017 | Wang | |
| 9,586,750 | B1 | 3/2017 | Mangold | |
| D794,755 | S | 8/2017 | Wang | |
| D800,868 | S | 10/2017 | Crenshaw | |
| D801,477 | S | 10/2017 | Mazur | |
| D803,353 | S | 11/2017 | Negri et al. | |
| D812,718 | S | 3/2018 | Kosaka | |
| D821,545 | S | 6/2018 | Gehrung | |
| D830,506 | S | 10/2018 | Gehrung et al. | |
| D831,792 | S | 10/2018 | Gehrung et al. | |
| D835,235 | S | 12/2018 | Gehrung et al. | |
| D854,123 | S | 7/2019 | Becker et al. | |
| D858,698 | S | 9/2019 | Arino et al. | |
| D861,130 | S | 9/2019 | Carls | |
| D875,885 | S | 2/2020 | Johnston et al. | |
| D877,294 | S | 3/2020 | Johnston | |
| 2002/0109019 | A1* | 8/2002 | May | B05B 15/557 239/528 |
| 2004/0050867 | A1 | 3/2004 | Alexander et al. | |
| 2006/0283386 | A1 | 12/2006 | Alexander et al. | |
| 2011/0121103 | A1 | 5/2011 | Carleton et al. | |
| 2012/0118990 | A1 | 5/2012 | Beever | |
| 2015/0017327 | A1 | 1/2015 | Myers et al. | |
| 2017/0231212 | A1 | 8/2017 | Crenshaw | |
| 2018/0111142 | A1 | 4/2018 | Joaquim et al. | |
| 2019/0029233 | A1 | 1/2019 | Lyngøy | |
| 2019/0076857 | A1 | 3/2019 | Fideler | |
| 2019/0321838 | A1 | 10/2019 | Theis | |

FOREIGN PATENT DOCUMENTS

| | | | |
|---|---|---|---|
| CN | 103298564 | A | 9/2013 |
| CN | 203459210 | U | 3/2014 |
| CN | 303517520 | | 12/2015 |
| CN | 303875730 | | 10/2016 |
| CN | 303965875 | | 12/2016 |
| CN | 106370053 | A | 2/2017 |
| CN | 107107095 | A | 8/2017 |
| CN | 107223075 | A | 9/2017 |
| CN | 108745696 | A | 11/2018 |
| CN | 304872873 | | 11/2018 |
| DE | 3148898 | A1 | 6/1983 |
| DE | 20104036 | U1 | 6/2001 |
| EP | 0462749 | A1 | 12/1991 |
| EP | 0729791 | A2 | 9/1996 |
| EP | 1232796 | A1 | 8/2002 |
| WO | 9625237 | A1 | 8/1996 |
| WO | 2009015260 | A2 | 1/2009 |

OTHER PUBLICATIONS

First Indian Exam Report for IN Application No. 318118-001, Dated Jun. 28, 2019, pp. 2.

First Indian Exam for IN Application No. 318117-001, Dated Jun. 28, 2019, pp. 2.

https://my.jualomatic.co/harga-3600psi-high-pressure-airless-paint-spray-gun-spray-tip-nozzle-seat-for-paint-latex-sprayer-spraying-machine-price-in-malaysia/ (Year:2019).

Extended European Search Report for EP Application No. 19166594.2, Dated Sep. 2, 2019, pp. 9.

Communication pursuant to 94(3) EPC for EP Application No. 19166594.2, dated Jul. 21, 2020, pp. 7.

First Chinese Office Action for CN Application No. 2019102412884, Dated Sep. 4, 2020, pp. 10.

First Chinese Office Action for CN Application No. 2019102411947, Dated Oct. 10, 2020, pp. 30.

First ROC (Taiwan) Design Office Action for TW Application No. 108303169, Dated Dec. 11, 2019, pp. 4.

Second ROC (Taiwan) Design Office Action for TW Application No. 108303169, Dated Mar. 19, 2020, pp. 6.

First Examination Report for IN Application No. 329347-001, Dated Jun. 10, 2020, pp. 2.

Extended European Search Report for EP Application No. 20216884.5, Dated Jun. 4, 2021, pp. 10.

First Notification to make Rectification for CN Application No. 202023279726.3, Dated Aug. 16, 2021, pp. 4.

First Notice to make Rectification for CN Application No. 202023276510.1, Dated Aug. 16, 2021, pp. 4.

First Chinese Office Action for CN Application No. 202011602674.0, Dated Mar. 16, 2022, pp. 32.

Second Chinese Office Action for CN Application No. 202011602674.0, Dated Oct. 12, 2022, pp. 16.

First Communication Pursuant to Article 94(3) EPC for EP Application No. 20216884.5, Dated Jan. 5, 2023, pp. 9.

Third Chinese Office Action for CN Application No. 202011602674.0, Dated Feb. 28, 2023, pp. 17.

Extended European Search Report for EP Application No. 24210220.0, Dated Jan. 31, 2025, 12 pages.

* cited by examiner

SPRAY GUN FOR SPRAYING PAINTS AND OTHER COATINGS

CROSS-REFERENCE TO REPLATED APPLICATION(S)

This application is a continuation of U.S. application Ser. No. 17/119,179 filed Dec. 11, 2020 for "SPRAY GUN FOR SPRAYING PAINTS AND OTHER COATINGS", which in turn claims the benefit of This application claims priority to U.S. Provisional Application No. 62/955,894 filed Dec. 31, 2019, and entitled "SPRAY GUN FOR SPRAYING PAINTS AND OTHER COATINGS," the disclosures of which are hereby incorporated by reference in their entireties.

BACKGROUND

This disclosure relates generally to sprayers. More specifically, this disclosure relates to spray guns for sprayers.

Spray guns can be used to spray fluids on surfaces. For example, spray guns can be used to spray paint, lacquer, finishes, and other coatings on walls, ceilings, and other structures. While various fluids can be sprayed by the embodiments referenced herein, paint will be used as an example.

Typically, the paint is placed under pressure by a piston, diaphragm, or other positive displacement pump. The pump can place the paint under pressure between 500 to 5,000 pounds per square inch (psi), although higher and lower pressures are possible. The pump outputs the paint under pressure through a flexible hose. A spray gun is used to dispense the paint, the gun being attached to the end of the hose opposite the pump. In this way, the spray gun does not include a pump, but rather releases paint pumped to the spray gun through the hose. The spray gun atomizes the paint under pressure into a spray fan, which is applied to a surface. The pump and mechanical and/or electrical systems which operate the pump are typically stationary while the user moves the gun and hose around to spray various surfaces.

Paint and other coatings can be abrasive and can wear on the spray gun and other components of the spray system. Spray guns typically require maintenance over time, which involves replacement of components worn down by use, particularly those components that move while handling the flow of paint under high fluid pressure. Ideally, users are able to service and repair the spray gun in the field to minimize disruption to their present project. A spray gun having enhanced field serviceability is disclosed herein. Other spray gun features are disclosed herein as well.

SUMMARY

According to one aspect of the disclosure, a spray gun includes a gun body, a handle extending from the gun body and having a front side and a rear side, a fitting connected to a lower end of the handle to provide fluid to a flowpath through the handle, and a tail projecting from the lower end of the handle and at least partially covering the fitting.

According to another aspect of the disclosure, a spray gun includes a gun body, a trigger connected to the gun body to actuate a valve to control spraying by the spray gun, a handle extending from the gun body and having a front side and a rear side, and a trigger guard configured to connect to the gun body and the handle. The trigger guard extends about an area within which a pull of the trigger is disposed. The trigger guard is rotatable relative to the handle and the handle includes a portion configured to interface with the trigger guard to prevent the trigger guard from completing a full rotation about the handle. The trigger guard can exert torque on the handle by the interface between the trigger guard and the portion to connect and disconnect the handle from the gun body.

According to yet another aspect of the disclosure, a method includes disconnecting a trigger guard from a gun body of a spray gun configured to emit a spray of fluid; rotating the trigger guard in a first rotational direction relative to a handle of the spray gun that the trigger guard is connected to; and exerting torque on the handle by the trigger guard contacting a first portion of the handle to rotate the handle in the first rotational direction relative to the gun body.

According to yet another aspect of the disclosure, a method of spraying with a spray gun having a gun body, a trigger configured to control spraying by the spray gun, a handle extending from the gun body, and a trigger guard extending between the gun body and the handle, includes grasping the handle of the spray gun such that a first finger interfacing with the trigger is disposed in an area between the trigger guard and the handle and a second finger is disposed outside of the area; manipulating an orientation of the spray gun by exerting a force on the trigger guard by the second finger interfacing with the trigger guard; and actuating the trigger with the first finger to cause spraying by the spray gun.

According to yet another aspect of the disclosure, a spray gun includes a gun body, a trigger connected to the gun body to actuate a valve to control spraying by the spray gun, a handle extending from the gun body and having a front side and a rear side, and a trigger guard extending between and connected to the gun body and the handle. The gun body, the handle, and the trigger guard define an area within which a pull of the trigger is disposed. The trigger guard includes a contour disposed proximate the handle and configured to receive at least one finger of the user disposed outside of the area.

DETAILED DESCRIPTION

Figure 1A:
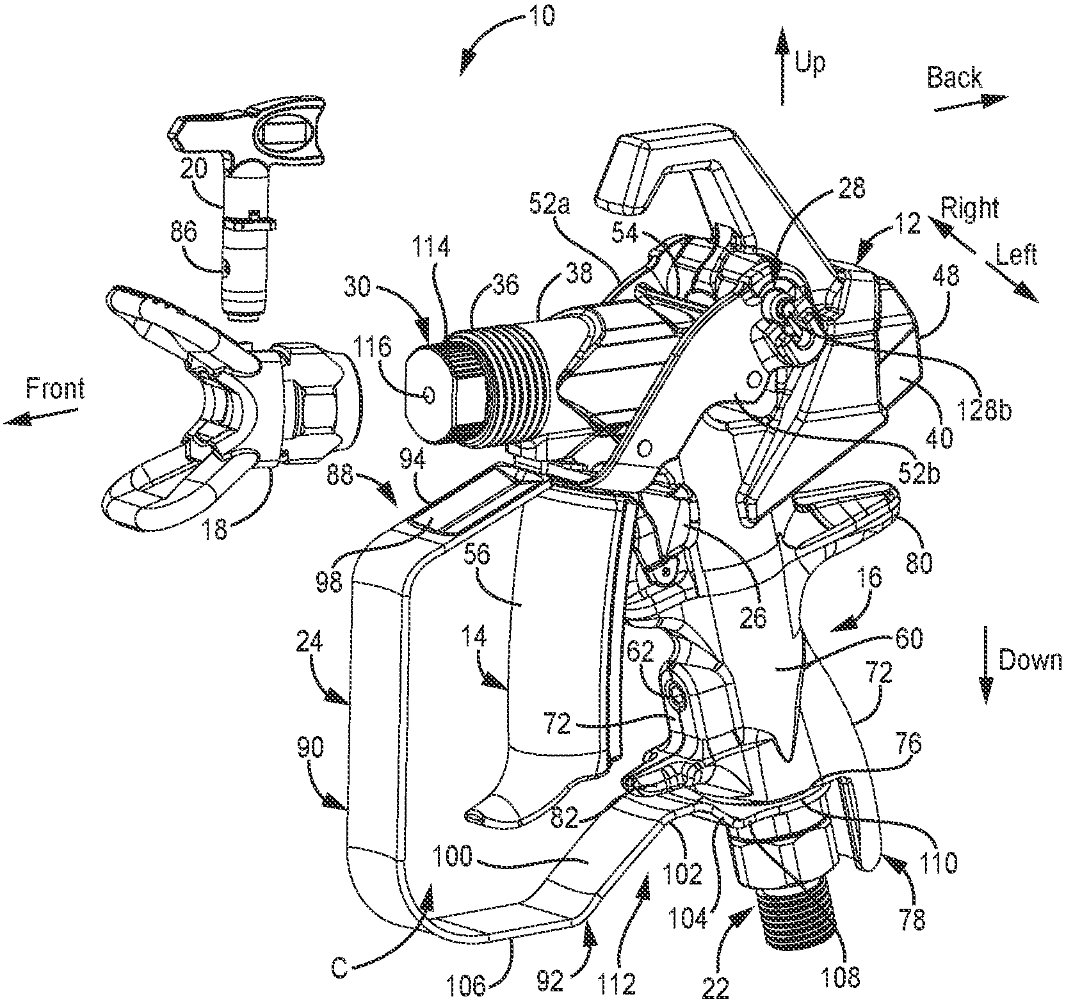
FIG. 1A is an isometric, partially exploded view of a spray gun.
Figure 1B:
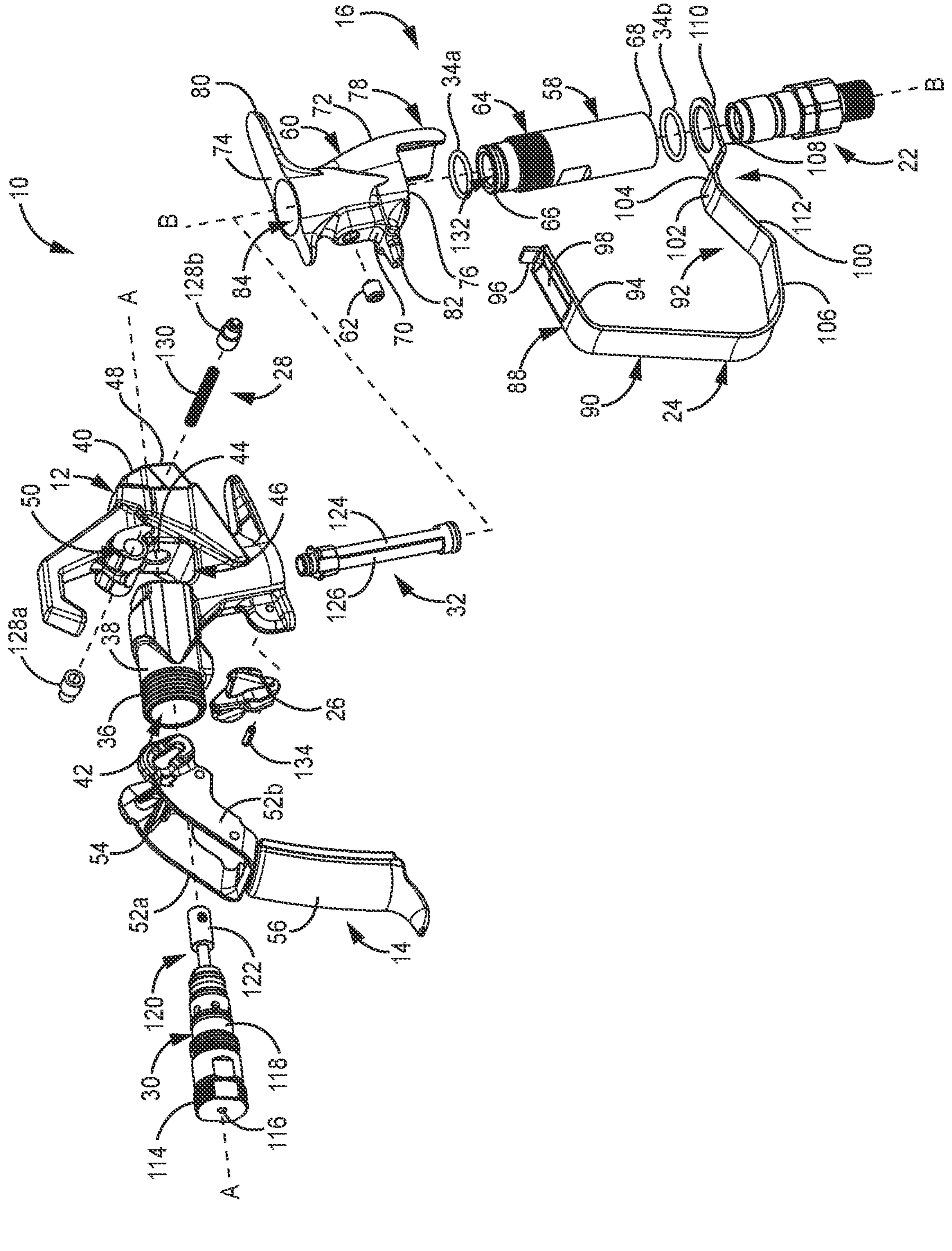
FIG. 1B is an exploded view of the spray gun shown in FIG. 1A.

FIG. 1A is an isometric, partially exploded view of spray gun 10. FIG. 1B is an exploded view of spray gun 10. FIGS. 1A and 1B will be discussed together. Gun body 12, trigger 14, handle 16, tip mount 18, tip 20, fitting 22, trigger guard 24, safety 26, pivot mechanism 28, valve cartridge 30, filter 32, and handle seals 34*a*, 34*b* (collectively herein "handle seal 34") of spray gun 10 are shown. Mounting surface 36, front end 38, back end 40, bore 42, cavity 44, void 46, back side 48, and pivot bore 50 of gun body 12 are shown. Trigger 14 includes arms 52*a*, 52*b* (collectively herein "arms 52"), actuator 54, and pull 56. Handle 16 includes inner portion 58, outer portion 60, set screw 62, and connector 64. Inner portion 58 includes top end 66 and bottom end 68. Outer portion 60 includes front side 70, back side 72, first end 74, second end 76, tail 78, upper projection 80, lower projection 82, and handle bore 84. Tip 20 includes nozzle 86. Trigger guard 24 includes upper portion 88, intermediate portion 90, and lower portion 92. Upper portion 88 includes main leg 94 and prong 96. Main leg 94 includes depression 98. Lower portion 92 includes first leg 100, second leg 102, third leg 104, fourth leg 106, fifth leg 108, and ring 110. Contour 112 is defined by first leg 100, second leg 102, and third leg 104. Grip surface 114, cartridge outlet 116, housing 118, and slider assembly 120 of valve cartridge 30 are shown. Slider 122 of slider assembly 120 is shown. Filter 32 includes filter body 124 and mesh 126. Pivot mechanism 28 includes detents 128*a*, 128*b* (collectively herein "detents 128") and spring 130.

Tip mount 18 is attached to gun body 12 at mounting surface 32. Tip mount 18 can be removably mounted to gun body 12. For example, tip mount 18 can fit over a front end of gun body 12, and tip mount 18 can include internal threading that interfaces with external threading on the front end of gun body 12 to fix tip mount 18 to gun body 12. In such an example, mounting surface 36 can include the external threading. Unthreading tip mount 18 from gun body 12 allows removal of tip mount 18 from gun body 12. Spray tip 20 is mounted in a bore of tip mount 18. Nozzle 86 is formed in spray tip 20. Nozzle 86 can be formed from carbide or another metal. Nozzle 86 includes a narrow outlet that is configured to atomize the paint exiting nozzle 86 into a spray fan. Spray tip 20 is mounted in tip mount 18 such that spray tip 20 can be rotated 180 degrees to reverse the direction of paint flow through nozzle 86. Rotating tip mount exposes a larger opening than the opening of nozzle 86. That larger opening is disposed on the opposite side of spray tip 20 from nozzle 86. Any clogs can be dislodged from tip 20 and ejected from that larger opening with spray tip 20 is in the reversed position.

Gun body 12 is mounted on handle 16. Gun body 12 can be formed of any suitable material for receiving various components of spray gun 10 and for providing a pathway for pressurized paint. In some examples, gun body 12 is formed from a metal, such as aluminum.

Handle 16 is removable from gun body 12. Handle 16 can be formed from polymer, metal, or a combination thereof, among other options. Handle 16 is configured to be gripped by one hand of a user to hold, support, and aim spray gun 10 while also allowing the user to actuate trigger 14. Specifically, the user can grasp and hold outer portion 60 with the one hand. Inner portion 58 is disposed within outer portion 60 of handle 16 and extends through handle bore 84. Top end 66 of inner portion 58 projects out of handle bore 84 beyond first end 74 of outer portion Set screw 62 extends through front side 70 of outer portion 60 and engages inner portion 58 to secure inner portion 58 relative to outer portion 60. In the example shown, inner portion 58 is formed separate from outer portion 60 and disposed within outer portion 60. It is understood, however, that inner portion 58 and outer portion 60 can be integrally formed as a single part.

Connector 64 is disposed at top end 66 of inner portion 58. In the example shown, connector 64 is spaced from the distal end of top end 66. Connector 64 secures handle 16 to gun body 12. In the example shown, connector 64 is attached to gun body 12 by interfaced threading. Male threading on inner portion 58 forms connector 64 and that male threading is configured to interface with female threading in gun body 12. While handle 16 and gun body 12 are described as connected by interfaced threading, it is understood that handle 16 and gun body 12 can be connected in any suitable manner for providing a pressurized flowpath and allowing removal of handle 16. In some examples, the threading is clocked such that handle 16 is properly aligned with gun body 12 when handle 16 is fully installed on gun body 12. For example, such that upper projection 80 of outer portion 60 is disposed below and aligned with the projection extending rearward from the lower edge of back end 40 of gun body 12.

Fitting 22 is attached to handle 16. In the example shown, fitting 22 is connected to bottom end 68 of inner portion 58 opposite connector 64. A portion of fitting 22 extends into inner portion 58 while another portion of fitting projects downward from second end 76 of outer portion 60. Fitting 22 can include tool interface 158 configured to interface with a tool, such as a wrench, to facilitate installation and removal of fitting 22. Fitting 22 is configured to attach to the end of a hose that supplies paint to spray gun 10 under pressure. Fitting 22 can be of a quick disconnect type, or any other desired type of hose connector.

Upper projection 80 extends axially rearward from first end 74 and back side 72 of outer portion 60. Upper projection 80 and back side 72 define a contour configured to receive the area between the user's thumb and forefinger of the hand grasping handle 16. The contour further extends along the exterior surface of tail 78. Upper projection 80 provides an ergonomic resting spot for the user's hand when grasping handle 16 and can prevent spray gun 10 from slipping downward within the user's hand during operation. As shown, upper projection 80 has a flat upper surface configured to interface with a similarly flat lower surface formed on the projection of gun body 12.

Lower projection 82 extends from front side 70 of outer portion 60 of handle 16. Lower projection 82 can prevent pinching of the user's fingers by trigger 14 when trigger guard 24 is rotated during installation and removal of handle 16 from gun body 12, as discussed in more detail below. It is understood, however, that trigger guard 24 is configured to protect the user's fingers during operation to prevent pinching and is further configured to prevent undesired actuation of trigger 14. Some examples of handle 16 do not include lower projection 82.

Tail 78 projects downward from handle 16. More specifically, tail 78 projects downward from back side 72 of outer portion 60. Tail 78 extends downward beyond second end 76 of outer portion 60. As such, tail 78 provides the lowermost portion of handle 16. Tail 78 is arcuate and partially wraps around fitting 22. Tail 78 at least partially extends over and covers a length of fitting 22. Tail 78 further covers the interface between trigger guard 24 and handle 16. Tail 78 provides a surface for a portion of the user's hand, such as a portion of the palm, to rest on and interface with while the user operates spray gun 10. Tail 78 thereby provides ergonomic benefits to the user. In addition, tail 78 facilitates mounting and dismounting of handle 16 to and from gun body 12, as discussed in more detail below.

Handle seal 34*a* is disposed at top end 66 of inner portion 58 between the distal end of inner portion 58 and connector 64. Handle seal 34*a* is disposed between top end 66 and gun body 12 to seal an interface between handle 16 and gun body 12.

Filter 32 is disposed in handle 16 and is configured to filter particulate from the paint prior to the paint entering valve cartridge 30 and being sprayed. More particularly, filter 32 is disposed in a bore through inner portion 58 of handle 16. Filter body 124 supports the mesh 126 that filters the paint. In some operations, filter 32 can be removed and replaced each day or more than once per day. Filter 32 is replaced by disconnecting handle 16 from gun body 12, removing the old filter 32, inserting a new filter 32, and reconnecting handle 16 to gun body 12. Inner portion 58 can be a pressure carrying component that handles the pressure of the fluid flowing through inlet passage 132 through handle 16. As such, outer portion 60 of handle 16 can be formed from a less-resilient material than inner portion 58. Filter 32, inlet passage 132 through inner portion 58, and handle bore 84 through outer portion 60 are oriented on handle axis B-B.

Bore 42 is formed within front end 38 of gun body 12 and extends into back end 40 of gun body 12. Bore 42 is open on a front side of front end 38 of gun body 12. Bore 42 extends through front end 38 of gun body 12 to void 46 in gun body 12. Void 46 is disposed between front end 38 and back end 40 of gun body 12. In some examples, void 46 is open on the lateral and top sides of gun body 12. Cylindrical cavity 44 is a portion of bore 42 extending into back end 40 of gun body 12. Cylindrical cavity 44, and thus bore 42, does not extend through and is not open on back side 48 of gun body 12. Bore 42 is oriented on spray axis A-A.

Valve cartridge 30 is at least partially disposed within and is mounted to gun body 12. Valve cartridge 30 is at least partially disposed in bore 42 of gun body 12 and spans void 46. Specifically, housing 118 is disposed in the portion of bore 42 in front end 38 of gun body 12. A portion of valve cartridge 30, such as slider assembly 120, spans void 46. With slider assembly 120 spanning void 46, a portion of slider 122 is disposed in cylindrical cavity 44 formed in back end 40 of gun body 12. Paint is output from valve cartridge 30 via cartridge outlet 116. Valve cartridge 30 is covered by tip mount 18 when tip mount 18 is disposed on gun body 12. When valve cartridge 30 is secured to and within gun body 12, grip surface 114 is exposed out of the front end of gun body 12.

Trigger 14 is mounted to gun body 12 and is configured to actuate a valve element of valve cartridge 30 to control spraying by spray gun 10. Trigger 14 is mounted to gun body 12 at pivot mechanism 28. Pull 56 is disposed in the area C defined by trigger guard 24, gun body 12, and handle 16. Pull 56 forms the portion of trigger 14 that the user grasps with the user's fingers to actuate trigger 14 and cause spraying by spray gun 10. The user can exert a rearward, pulling force on pull 56 of trigger 14 to actuate trigger 14. Arms 52 extend from pull 56 and are disposed on opposite lateral sides of gun body 12 with trigger 14 mounted to gun body 12. Arms 52 connect trigger 14 to gun body 12 and are located on left and right lateral sides of gun body 12, while pull 56 of trigger 14 is centered with respect to the lateral sides of gun body 12. While two arms 52 are shown, it is understood that, in some examples, a single arm 52 can support trigger 14 and can be located on one side of gun body 12. Arms 52 and pull 56 can be integrally formed as a single part. In some examples, pull 56 can be formed from multiple parts fit together, while arms 52 can be formed integrally with one of the parts forming pull 56. For example, a front part of pull 56 that interfaces with the user's fingers can be formed from a polymer while a rear part of pull 56, which can be at least partially covered by the front part, can be formed from a metal. It is understood that while arms 52 can be formed from the same material as the pull 56 (e.g., a contiguous piece of metal), arms 52 can also be formed separate from pull 56, from either the same or different materials, and can be fixed to pull 56 at the lower ends of arms 52. For example, arms 52 can be formed integrally with or attached to the rear part of pull 56.

Actuator 54 extends between and is attached to arms 52. Actuator 54 can be formed from the same material as arms 52 or from a different material from arms 52. It is thereby understood that actuator 54 and arms 52 can be formed as a unitary part (i.e., single contiguous piece of material) or can be formed separately and fixed together. Actuator 54 can be metallic or can be formed from another suitably durable material for impacting slider 122 to actuate the valve within valve cartridge 30. Actuator 54 extends between the opposed, inside surfaces of arms 52 and through void 46 in gun body 12 to connect arms 52. Actuator 54 moves with arms 52 and pull 56 and pivots with respect to gun body 12. Actuator 54 moves within void 46 along with trigger 14 to push a part (e.g., slider 122) of valve cartridge 30 rearwards to open the valve within valve cartridge 30 when spraying is desired. Actuator 54 can release the part of valve cartridge 30 to close the valve when spraying is not desired.

Arms 52 are connected to gun body 12 at pivot mechanism 28. More specifically, arms 52 are connected to gun body 12 by detents 128 extending into slots formed in arms 52. Arms 52 interface with detents 128 to form a pivot point about which trigger 14 pivots relative to gun body 12. Pivot bore 50 extends through gun body 12. In the example shown, pivot bore 50 extends laterally through back end 40 of gun body 12. Spring 130 is disposed in pivot bore 50 between detents 128, which are disposed on opposite lateral sides of pivot bore 50. Spring 130 interfaces with detents 128 to exert a laterally outward force on detents 128 to cause detents 128 to engage with the slots formed in arms 52.

Safety 26 is attached to gun body 12 by pin 134. Safety 26 is configured to pivot between a stowed, up position, as shown in FIG. 1A, and a deployed, down position. With safety 26 in the stowed position, trigger 14 can be pulled by the user to activate spraying. With safety 26 in the deployed position, safety 26 interfaces with pull 56 of trigger 14 to prevent trigger 14 from being pulled, thereby preventing the user from activating spraying.

Trigger guard 24 is attached to and extends between gun body 12 and handle 16. Trigger guard 24, gun body 12, and handle 16 define area C within which pull 56 of trigger 14 is disposed when trigger 14 is in either of the activated and deactivated states.

Upper portion 88 of trigger guard 24 is attached to gun body 12 and lower portion 92 of trigger guard 24 is secured to the handle assembly, which can be considered as including handle 16 and fitting 22. In some examples, lower portion 92 is secured between fitting 22 and handle 16. Intermediate portion 90 extends between and connects upper portion 88 and lower portion 92.

Trigger guard 24 is attached to gun body 12 by prong 96 extending into a slot, such as slot 140 (FIG. 2), formed in a lower side of front end 38 of gun body 12. Prong 96 is formed at the distal end of upper portion 88 of trigger guard 24. Prong 96 extends along an axis transverse to the axis along which main leg 94 of upper portion 88 extends. Prong 96 further has a width smaller than the width of main leg 94 of upper portion 88. A spring force exerted by trigger guard 24 retains prong 96 within the slot of gun body 12. Depression 98 is formed in main leg 94. The user can exert a downward force on main leg 94 by, for example, placing a thumb or finger in depression 98 and exerting a downward force to remove prong 96 from the slot in gun body 12.

Fourth leg 106 of lower portion 92 extends from intermediate portion 90. Ring 110 is formed at the distal end of lower portion 92 of trigger guard 24 and extends from fifth leg 108 of lower portion 92. Ring 110 facilitates connection of trigger guard 24 to handle 16. A portion of fitting 22 extends through ring 110 and into inner portion 58 of handle 16 to secure ring 110 to handle 16. Handle seal **34*b* is disposed at bottom end 68 of inner portion 58 at an interface between ring 110 and handle 16. In addition to protecting the fingers of the user and preventing undesired actuation of trigger 14, trigger guard 24 facilitates mounting and dismounting of handle 16 from gun body 12**, as discussed in more detail below.

Contour 112 is formed in lower portion 92 of trigger guard 24. Contour 112 is formed between fourth leg 106 and fifth leg 108. Contour 112 is formed by first leg 100, second leg 102, and third leg 104 of lower portion 92. With trigger guard 24 mounted to spray gun 10, contour 112 is disposed below lower projection 82. Contour 112 is positioned below the distal end of pull 56 when trigger 14 is in an activated state. As such, trigger 14 can move over the uppermost portion of contour 112 as trigger 14 is activated and deactivated. Contour 112 is configured to receive the fingers of the user that are not interfacing with and actuating the trigger 14 while the user grasps handle 16. Trigger guard 24 can be considered to form part of handle 16 because the user can exert force on trigger guard 24 as the user manipulates and aims spray gun 10. For example, the first two fingers of the user (index and middle finger) can be disposed on pull 56 to actuate trigger 14, while the third finger of the user (ring finger) can be disposed below trigger guard 24 in the area defined by contour 112, and the fourth finger of the user (pinky finger) can be disposed below the third finger and, in some cases, as least partially within the area defined by contour 112. In another example, the first finger of the user (index finger) can be disposed on pull 56 to actuate trigger 14, while the remaining three fingers of the user can be disposed below lower portion 92, outside of area C, and at least partially within the area defined by contour 112. Contour 112 thereby provides an ergonomic profile facilitating the user grasping and manipulating spray gun 10. The user's palm can rest at least partially on back side 72 of outer portion 60 below upper projection 80 and partially on the exterior surface of tail 78.

During operation, the user grasps handle 16 with either of the user's hands. Trigger guard 24 is sized such that a typical user can wrap one or two fingers around trigger 14 within area C while grasping handle 16. The number of fingers disposed on pull 56 is determined by the user grasping spray gun 10. For example, the user can extend the user's reach by grasping spray gun further down on handle 16 such that the first finger (index finger) wraps around pull 56 and the second through fourth fingers are positioned outside of area C and within and/or below contour 112. The fingers disposed outside of area C are positioned below lower portion 92 of trigger guard 24. The uppermost finger outside of area C is disposed in contour 112. A portion of the user's hand, such as the palm, wraps around back side 72 of outer portion 60 and can rest on the exterior surface of tail 78. Tail 78 thereby prevents the user's hand from contacting fitting 22, protecting the interface between fitting 22 and handle 16. Tail 78 further provides an ergonomic, comfortable resting spot for that portion of the user's hand interfacing with tail 78. Contour 112 receiving one or more fingers also provides an ergonomic, comfortable resting spot for one or more fingers. The user's hand interfacing with trigger guard 24 to further torque and move spray gun 10, such that trigger guard 24 forms part of the handle 16, facilitates more ergonomic and efficient spraying and reduces user fatigue.

Figure 2:
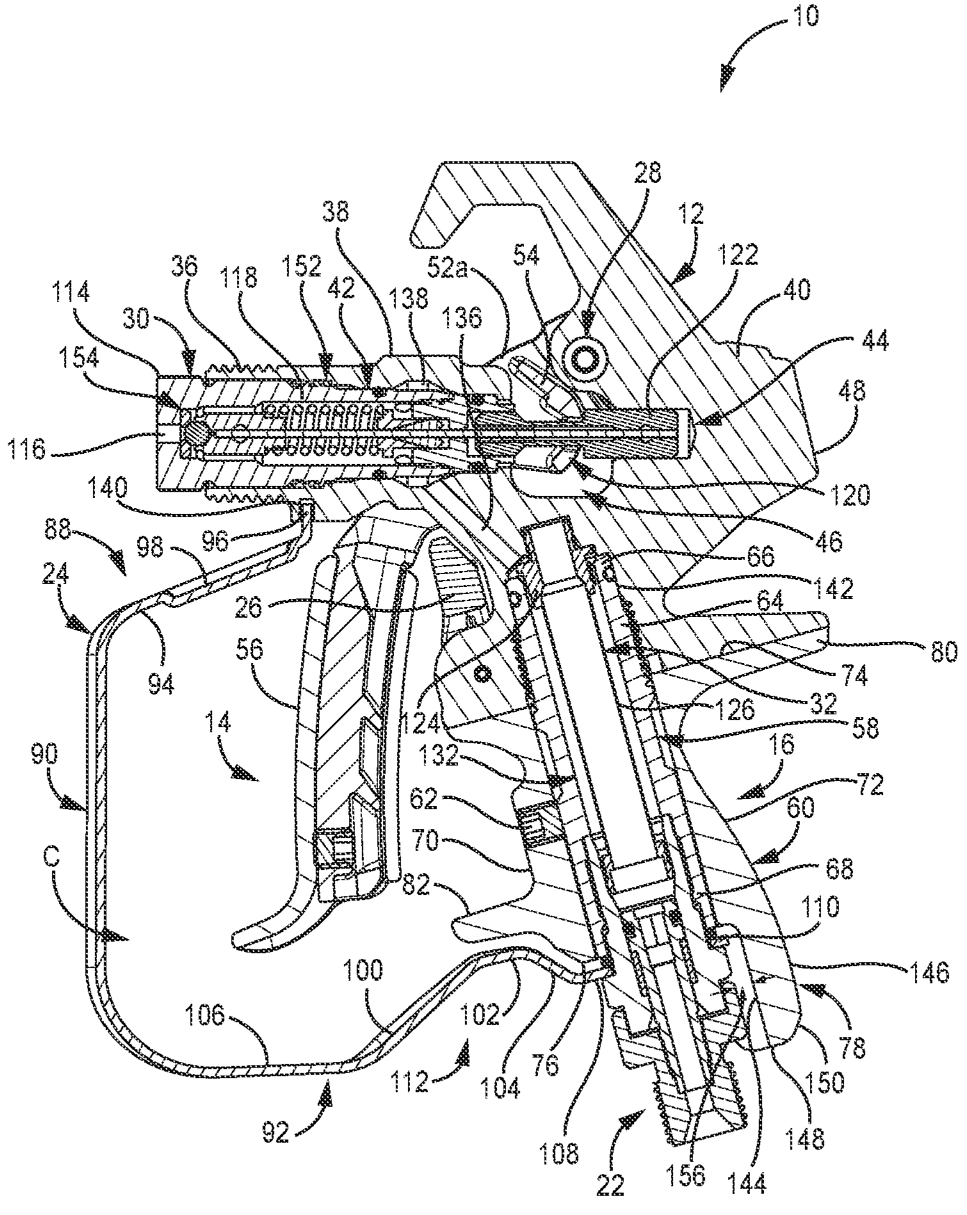
FIG. 2 is a cross-sectional view of a spray gun.

FIG. 2 is a cross-sectional view of spray gun 10. Gun body 12, trigger 14, handle 16, fitting 22, trigger guard 24, safety 26, pivot mechanism 28, valve cartridge 30, filter 32, and threaded interface 152 of spray gun 10 are shown. Gun body 12 includes mounting surface 36, front end 38, back end 40, bore 42, cavity 44, void 46, back side 48, channel 136, chamber 138, slot 140, and receiving bore 142. Trigger 14 includes arms **52*a*, 52*b* (only arm 52*a* is shown in FIG. 2), actuator 54, and pull 56. Handle 16 includes inner portion 58, outer portion 60, set screw 62, and connector 64. Inner portion 58 includes top end 66 and bottom end 68. Outer portion 60 includes front side 70, back side 72, first end 74, second end 76, tail 78, upper projection 80, and lower projection 82. Tail 78 includes inner side 144, outer side 146, distal end 148, and edge 150. Trigger guard 24 includes upper portion 88, intermediate portion 90, and lower portion 92. Upper portion 88 includes main leg 94, which includes depression 98, and prong 96. Lower portion 92 includes first leg 100, second leg 102, third leg 104, fourth leg 106, fifth leg 108, and ring 110. Contour 112 is defined by first leg 100, second leg 102, and third leg 104. Valve cartridge 30 includes grip surface 114, cartridge outlet 116, housing 118, slider assembly 120, and valve 154. Slider assembly 120 includes slider 122. Filter 32 includes filter body 124 and mesh 126**.

Valve cartridge 30 is disposed within gun body 12 and fits within bore 42. Bore 42 forms, amongst other features, chamber 138 through which valve cartridge 30 receives paint. A portion of valve cartridge 30, such as slider 122, bridges void 46. A portion of slider 122 fits within cavity 44 within gun body 12. Bore 42 and cavity 44 are coaxially aligned on spray axis A-A. Housing 118 can be prevented from moving rearward with respect to gun body 12 by a narrowing of the exterior surface of valve cartridge 30 fitting into and engaging a narrowing interior surface of bore 42, the narrowing can occur from a front towards the back of bore 42.

Paint is output from valve cartridge 30 via cartridge outlet 116. Threaded interface 152 is formed between the exterior of housing 118 of valve cartridge 30 and the interior of bore 42. Threaded interface 152 secures valve cartridge 30 within bore 42. Valve cartridge 30 can be unscrewed and then removed from bore 42 through the front end of bore 42. Valve 154 is disposed within housing 118 and is connected to slider assembly 120. Valve 154 is configured to be actuated between an open state, where paint can flow downstream past valve 154 through cartridge outlet 116, and a closed state, where valve 154 prevents paint from flowing downstream through cartridge outlet 116. Actuator 54 of trigger 14 interfaces with slider 122 to actuate valve 154 between the open and closed states.

Handle 16 is removably mounted to gun body 12 by the top end 66 of inner portion 58 of handle 16 extending into receiving bore 142 in gun body 12. Connector 64 is formed on top end 66 of inner portion 58. In the example shown, connector 64 includes exterior threading configured to interface and mate with interior threading formed in receiving bore 142. As such, handle 16 can be secured to gun body 12 by interfaced threading formed on gun body 12 and handle 16. Fitting 22 is attached to a bottom of handle 16 opposite connector 64 and is configured to attach to the end of a hose that supplies paint to spray gun 10 under pressure. Tail 78 extends from second end 76 of outer portion 60. Edge 150 is formed on tail 78 between outer side 146 and distal end 148. Edge 150 provides a contour that eliminates sharp corners from tail 78. Gap 156 is disposed between tail 78 and fitting 22.

Inner portion 58 defines inlet passage 132 through which paint initially flows on entering spray gun 10. Filter 32 is disposed within inner portion 58 in inlet passage 132 and includes mesh 126 configured to filter particulate from the paint flowing through spray gun 10. Filter body 124 supports mesh 126. Inner portion 58 can be a pressure carrying component that handles the pressure of the fluid flowing through inlet passage 132 through handle 16.

Channel 136 extends between inlet passage 132 and bore 42 formed in gun body 12. Specifically, channel 136 extends from inlet passage 132 to chamber 138 where paint enters valve cartridge 30. Specifically, paint enters housing 118 of valve cartridge 30 from chamber 138.

Paint enters spray gun 10 via fitting 22. The paint travels through handle 16 within inlet passage 132 and passes through filter 32 to channel 136. Specifically, the paint travels through mesh 126 of filter 32 and into the space disposed between filter 32 and inner portion 58 of handle 16. The paint travels through channel 136 and into chamber 138. From chamber 138, the paint flows into housing 118 of valve cartridge 30 and eventually out of cartridge outlet 116 and then through nozzle 86 (FIG. 1A). With trigger 14 in the non-actuated state, valve 154 of valve cartridge 30 is in the closed state, thereby closing the flowpath through cartridge outlet 116 and preventing spraying of paint. With trigger 14 in the actuated state, where trigger 14 is pulled towards handle 16 from the non-actuated state shown, valve 154 of valve cartridge 30 is in the open state, thereby opening the flowpath through cartridge outlet 116 and allowing spaying of paint.

Figure 3A:
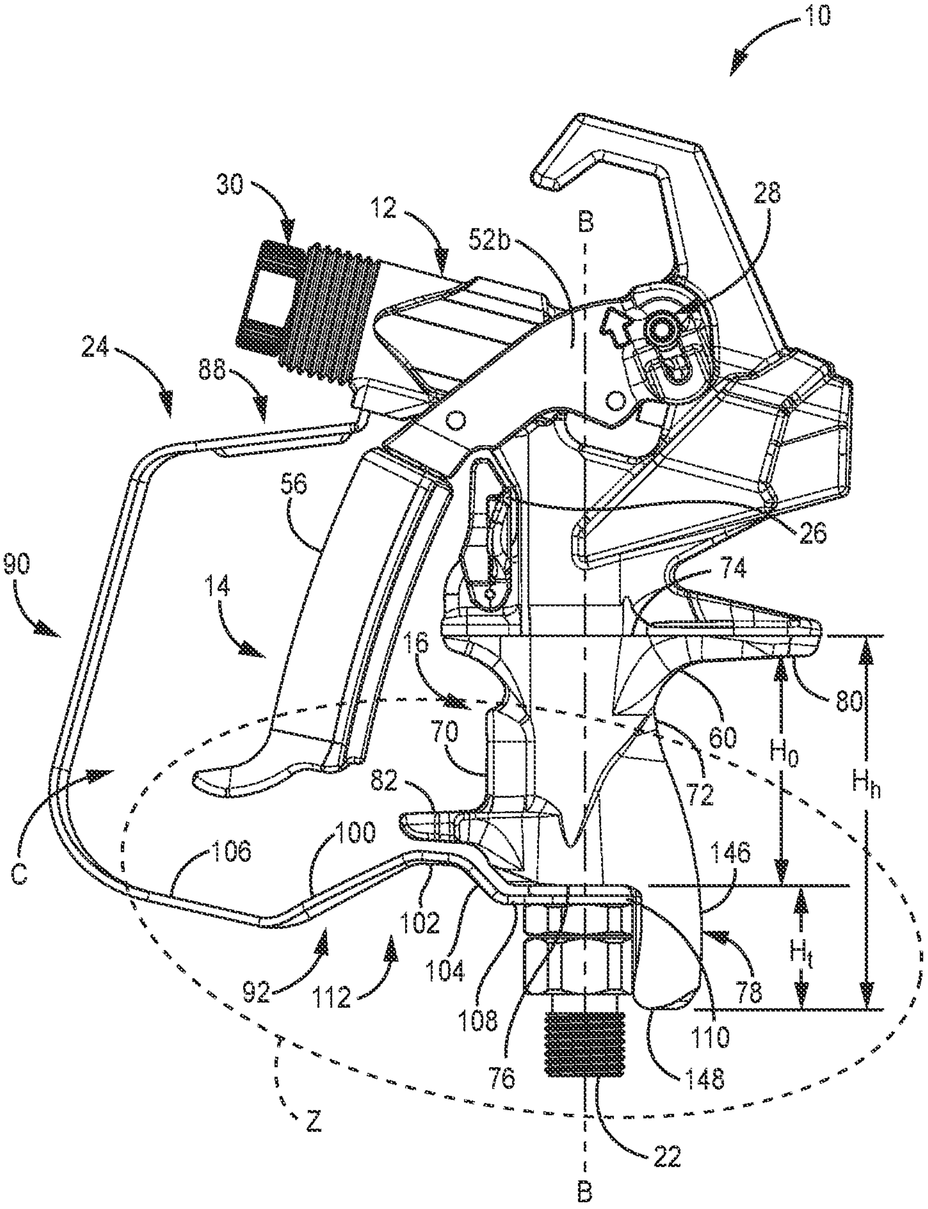
FIG. 3A is a side elevation view of a spray gun.
Figure 3B:
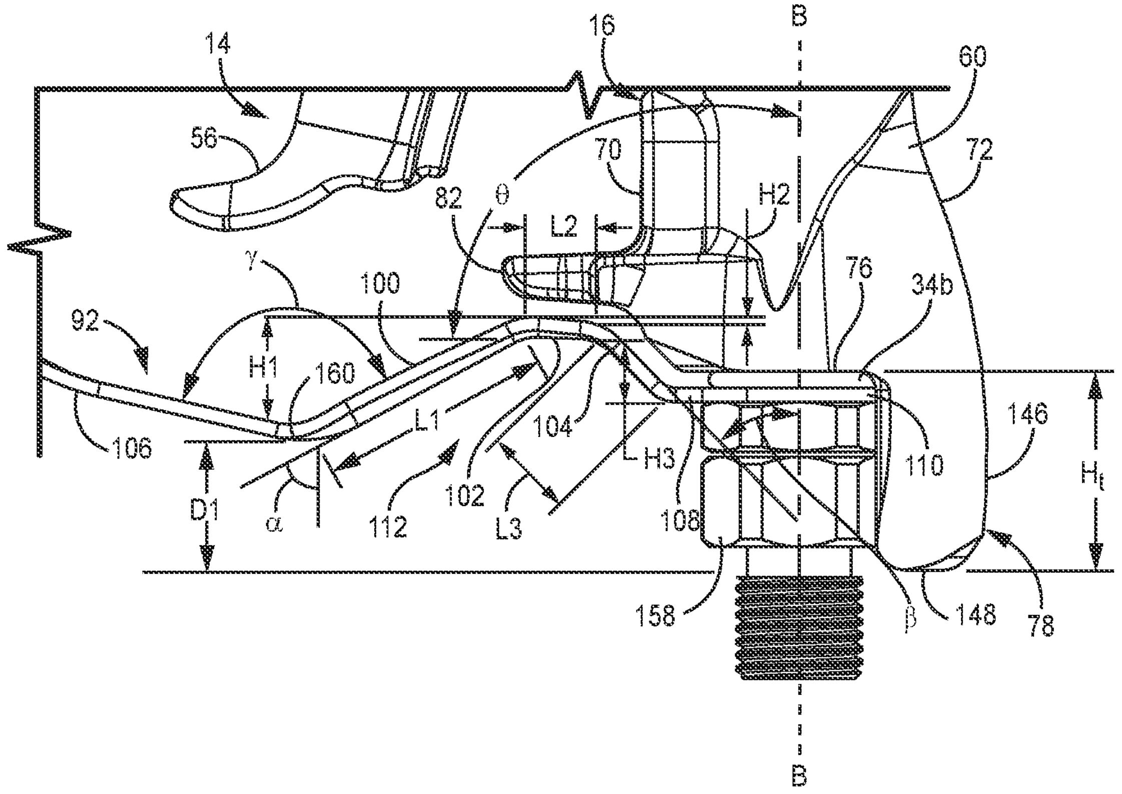
FIG. 3B is an enlarged view of detail Z shown in FIG. 3A.

FIG. 3A is a side elevation view of spray gun 10. FIG. 3B is an enlarged view of detail Z in FIG. 3A. FIGS. 3A and 3B will be discussed together. Gun body 12, trigger 14, handle 16, fitting 22, trigger guard 24, safety 26, pivot mechanism 28, and valve cartridge 30 of spray gun are shown. Arm 52*b* and pull 56 of trigger 14 are shown. Outer portion 60 of handle 16 is shown and includes front side 70, back side 72, first end 74, second end 76, tail 78, upper projection and lower projection 82. Distal end 148 and outer side 146 of tail 78 are shown. Trigger guard 24 includes upper portion 88, intermediate portion 90, and lower portion 92. Lower portion 92 includes first leg 100, second leg 102, third leg 104, fourth leg 106, fifth leg 108, and ring 110. Contour 112 is defined by first leg 100, second leg 102, and third leg 104.

Valve cartridge 30 is disposed in gun body 12 and configured to control spraying by spray gun 10. Trigger 14 is attached to gun body 12 by pivot mechanism 28. Specifically, arms 52*a*, 52*b* (only arm 52*b* is shown) is attached to gun body 12 by pivot mechanism 28. Trigger 14 pivots about pivot mechanism 28 to control spraying of paint through valve cartridge 30. Pull 56 is configured to interface with and be manipulated by fingers of the user to control spraying by spray gun 10. The fingers of the user that interface with pull 56 to manipulate trigger 14 are disposed in area C during spraying. One or more of the fingers disposed outside of area C can be disposed at least partially in contour 112.

Handle 16 is removably connected to gun body 12. Handle 16 can be removed to allow the user to remove and replace filter 32 (FIGS. 1B, 2, 4A, and 4B). Upper projection 80 extends from back side 72 of handle 16 and interfaces with a similarly configured projection of gun body 12. Upper projection 80 extends over the portion of the user's hand between the thumb and index finger while the user grasps handle 16. Lower projection 82 extends from front side 70 of handle 16 into area C defined by trigger guard 24, gun body 12, and handle 16 and within which pull 56 of trigger 14 is disposed.

Tail 78 projects downwards from back side 72 of handle 16. Tail 78 projects from second end 76 and generally away from gun body 12. Tail 78 is a bottom-most portion of handle 16. Tail 78 extends below and at least partially covers the location where ring 110 connects trigger guard 24 to spray gun 10. Tail 78 at least partially wraps around and at least partially covers fitting 22. Distal end 148 of tail 78 is the lowest point of handle 16. Tail 78 extends below tool interface 158 of fitting 22 such that distal end 148 is disposed below tool interface 158. Tool interface 158 is configured to interface with a tool, such as a wrench, to allow the user to connect and disconnect fitting 22 from handle 16.

Tail 78 has a height Ht between second end 76 and distal end 148. Handle 16 has a height Hh between first end 74 and distal end 148. Height Ht is between about 0.75-0.90 inches (in.) (about 1.91-2.29 centimeters (cm)). In some examples, height Ht is between about 0.80-0.85 in. (about 2.05-2.15 cm). In one example, height Ht is 0.83 in. (about 2.11 cm). Height Hh can be about 2.40-2.60 in. (about 6.10-6.60 cm). In one example, height Hh is 2.50 in. (6.35 cm). Height Ht of tail 78 is less than height Hh of handle 16. In some examples, height Ht of tail 78 is less than half height Hh of handle 16. In some examples, height Ht of tail 78 is about ⅓ the height Hh of handle 16. As such, height Ht of tail 78 can be about half of height Ho of outer portion 60 between first end 74 and second end 76.

Trigger guard 24 extends around and at least partially defines area C within which pull 56 of trigger 14 is disposed. Upper portion 88 of trigger guard 24 is connected to gun body 12. Lower portion 92 of trigger guard 24 is secured between handle 16 and fitting 22. Ring 110 is formed at the distal end of lower portion 92 of trigger guard 24 and extends from fifth leg 108. In some examples, fifth leg 108 and ring 110 extend along a common axis such that fifth leg 108 and ring 110 are planar relative each other. A portion of fitting 22 projects through ring 110 and fitting 22 is connected to handle 16 to secure lower portion 92 to spray gun 10. Handle seal 34*b* is disposed between ring 110 and second end 76. An element (e.g., fitting 22) must be removed from spray gun 10 prior to fully disconnecting trigger guard 24 from spray gun 10. Contrarily, upper portion 88 can be disconnected from spray gun 10 by exerting a downward force on main leg 94 of upper portion 88 to remove prong 96 (best seen in FIG. 1B) from slot 140 (FIG. 2).

Intermediate portion 90 extends between and connects upper portion 88 and lower portion 92. Specifically, intermediate portion 90 extends between and is attached to each of main leg 94 and fourth leg 106. Each of upper portion 88 and lower portion 92 are disposed transverse to intermediate portion 90. Main leg 94 extends along an axis transverse to the axis that intermediate portion 90 extends on. Each of first leg 100, second leg 102, third leg 104, fourth leg 106, and fifth leg 108 extend along axes transverse to an axis that intermediate portion 90 extends along. While the various portions and legs of trigger guard 24 are described as extending along axes, it is understood that the various portions and legs can be curved along their lengths and/or include other contouring. The portions and legs extend generally along the axes discussed.

Fourth leg 106 is disposed transverse to intermediate portion 90 and extends from an end of intermediate portion 90 opposite the end of intermediate portion 90 that main leg 94 extends from. Fourth leg 106 is disposed at angle γ relative to first leg 100. Contour 112 is disposed between fourth leg 106 and fifth leg 108 and is defined by first leg 100, second leg 102, and third leg 104. Intersection 160 between first leg 100 and fourth leg 106 is a lowest point of trigger guard 24 relative to axis B-B. First leg 100 and fourth leg 106 form an obtuse angle γ on a side of intersection 160 facing into area C. The angle γ between first leg 100 and fourth leg 106 is greater than about 90-degrees and less than about 180-degrees.

First leg 100 extends between fourth leg 106 and second leg 102. Second leg 102 extends between first leg 100 and third leg 104. Third leg 104 extends between second leg 102 and fifth leg 108. Moving from intermediate portion 90 towards ring 110, first leg 100 extends upwards and towards handle 16, second leg 102 is disposed transverse to first leg 100 and extends towards handle 16, and third leg 104 is disposed transverse to second leg 102 and extends downwards and towards fitting 22.

First leg 100 is disposed at angle α relative to axis B-B extending through handle 16. In some examples, angle α is between about 55-75 degrees. More particularly angle α can be between about 60-65 degrees. In one example, angle α is about 62 degrees. First leg 100 has length L1, which can be between about 0.95-1.00 in. (about 2.41-2.54 centimeters (cm)). First leg 100 has height H1, which can be between about 0.40-0.50 in. (about 1.02-1.27 cm). Height H1 of first leg 100 is smaller than length L1 of first leg 100. In some examples, height H1 is equal to or less than half of length L1.

Second leg 102 is disposed at angle θ relative to axis B-B. In some examples, angle Θ is between about 0.85-0.95 degrees relative to axis B-B. In some examples, angle θ is an acute angle. In some examples, second leg 102 extends orthogonal to axis B-B. Second leg 102 has length L2, which can be between about 0.25-0.35 in. (about 0.64-0.89 cm). In one example, second leg 102 has length L2 of 0.3 in. (about 0.76 cm). Second leg 102 has height H2, which can be about 0.016 in. (about 0.041 cm), in some examples. In some examples, length L2 is up to 20× greater than height H2. In some examples, length L2 is between 15-20× greater than height H2.

Third leg 104 is disposed at angle β relative to axis B-B. In some examples, angle β is between about 40-50 degrees relative to axis B-B. More particularly, angle β can be between about 40-45 degrees. Third leg 104 has length L3, which can be between about 0.35-0.40 in. (about 0.89-1.02 cm). Third leg 104 has height H3, which can be between about 0.23-0.29 in. (about 0.58-0.74 cm). Length L3 is larger than height H3. In some examples, length L3 is about 1.5× height H3. In some examples, length L3 is between 1-1.5× height H3.

Length L1 of first leg 100 is greater than both length L2 of second leg 102 and length L3 of third leg 104. In some examples, length L1 is at least twice as large as either of lengths L2 and L3. In some examples, length L1 is three to four times as large as length L2. In some examples, length L1 is two to three times as large as length L3. In some examples, length L1 is larger than the combined lengths L2 and L3. In some examples, length L1 is about 1.5× as large as the combined lengths L2 and L3. The lengths L1-L3 may respectively be flat lengths such that the trigger guard 24 does not bend along the particular length.

Height H1 of first leg 100 is larger than both height H2 of second leg 102 and height H3 of third leg. Height H1 is larger than the combined heights H2 and H3. In some examples, height H1 is 1.75× as large as height H3. In some examples, height H1 is about 1.75× as large as the combined heights H2 and H3. As height H1 is a largest height of any of the legs forming contour 112, height H1 can be considered as being the height of contour 112.

A portion of contour 112 is disposed above second end 76 of outer portion 60 such that a vector extending radially from axis B-B would extend through each of front side 70 of outer portion 60 and that portion of contour 112. The portion of contour 112 disposed above second end 76 includes second leg 102 and parts of first leg 100 and third leg 104. In the example shown, the full length and height of second leg 102 are disposed above second end 76. In some examples, about half of the height of contour 112 is disposed above second end 76 and about half of the height of contour 112 is disposed below second end 76. In some examples, less than half of the height of contour 112 is disposed above second end 76. In some examples, about ⅖ of the height of contour 112 is disposed above second end 76. In some examples, a majority of the height of contour 112 is disposed below second end 76.

Height H1 is less than height Ht of tail 78. In some examples, height H1 is about half of height Ht. In some examples, height H1 is greater than half the height Ht. Distance D1 is a distance between the lowest point of contour 112, formed at intersection 160, and distal end 148 of tail 78 taken along axis B-B. In some examples, distance D1 is between about 0.50-0.60 in. (about 1.27-1.52 cm). Distance D1 is, in some examples, greater than half of height Ht of tail 78. In some examples, distance D1 is greater than ⅗ of height Ht of tail 78. In some examples, distance D1 is about ⅔ of height Ht of tail 78.

During operation, the user grasps handle 16 and positions fingers on pull 56 of trigger 14. The user manipulates trigger 14 with the fingers interfacing with pull 56 to control spraying by spray gun 10. Pull 56 is sized to accommodate one or two fingers of the user, depending on how the user grasps handle 16. In some examples, the user can grasp handle 16 lower on outer portion 60 and extend a single finger over pull 56. Such a grip allows the user to have a longer reach, such as towards a ceiling in a room or upper portions of walls. The remaining fingers of the user are disposed outside of area C. The uppermost one of the fingers disposed outside of area C can be received in contour 112 such that the finger interfaces with one or more of first leg 100, second leg 102, and third leg 104. The remaining fingers outside of area C are adjacent that uppermost one of the fingers and can be at least partially disposed within contour 112. In this way, the contour 116 of the trigger guard 24 serves as a handle part in that the user's hand engages the outside of the contour 116 to stabilize and point the spray gun 10 while the user pulls the trigger 14 while spraying. As such, the trigger guard 24 not only prevents unintended actuation of the trigger 14 but also serves a part of a handle.

The user's palm wraps around back side 72 of handle 16. A portion of the user's palm can rest on outer side 146 of tail 78. Contouring formed on back side 72 to facilitate ergonomic grasping of handle 16 extends onto outer side 146 of tail 78. As such, tail 78 further facilitates ergonomic grasping of spray gun 10. Tail 78 further prevents the user's palm from interfacing with and resting on fitting 22. Tail 78 thereby provides additional ergonomic benefits and protects the interface between handle 16 and fitting 22. For example, if spray gun 10 inadvertently fell, tail 78 would be impacted before fitting 22 if spray gun 10 fell backward, while trigger guard 24 would be impacted before fitting 22 if spray gun fell forward.

Figure 4A:
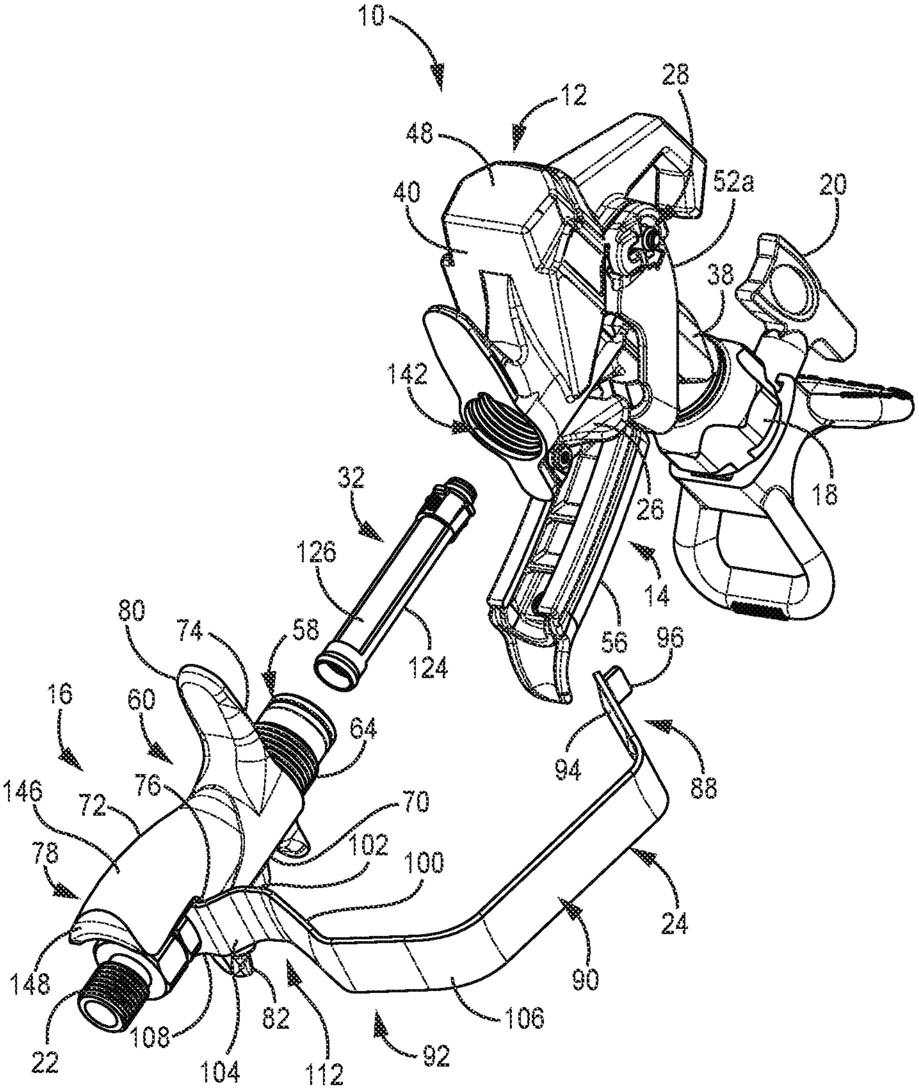
FIG. 4A is a partially exploded view of a spray gun showing a trigger guard rotated to a first position.
Figure 4B:
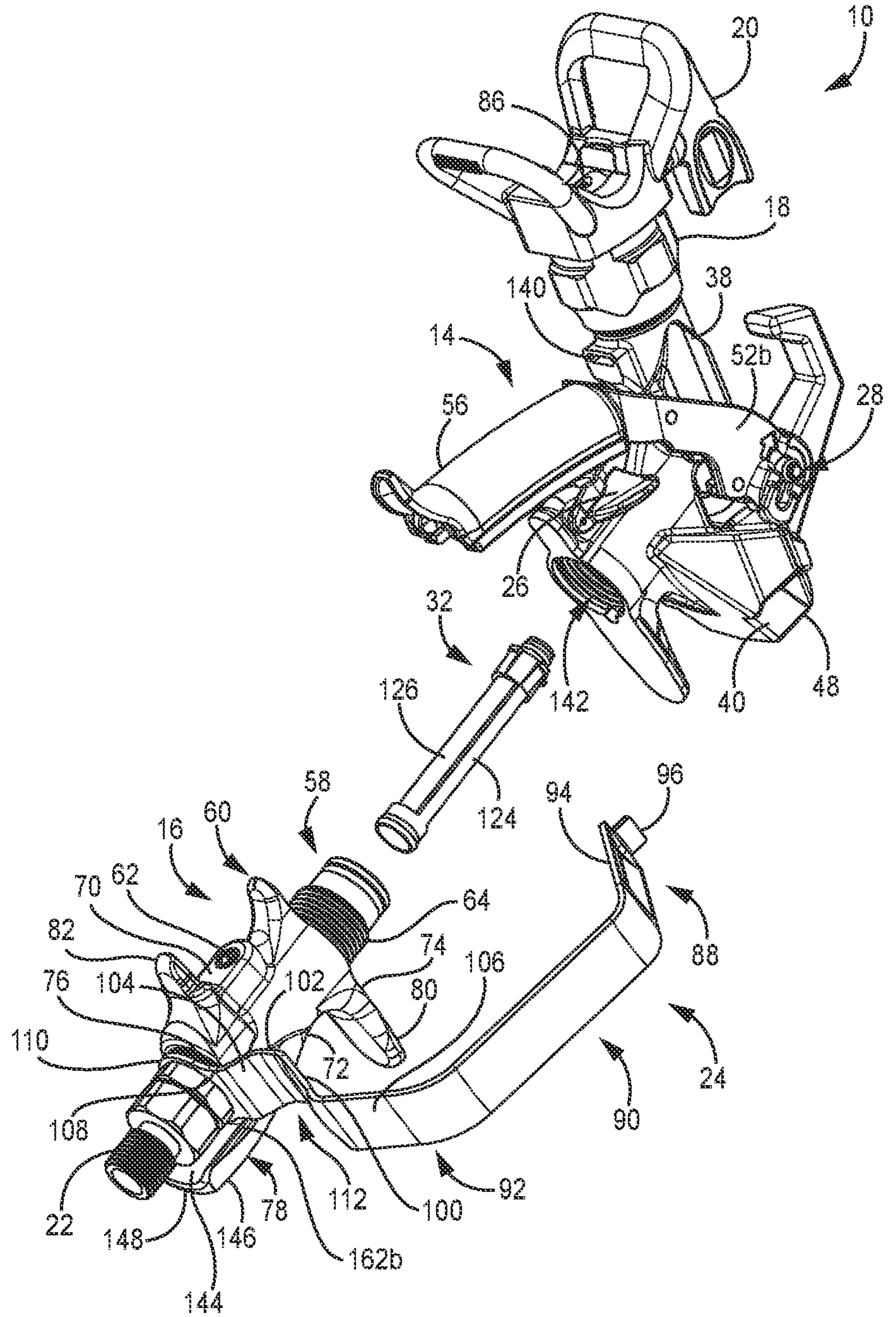
FIG. 4B is another partially exploded view of the spray gun of FIG. 4A showing the trigger rotated to a second position.
Figure 4C:
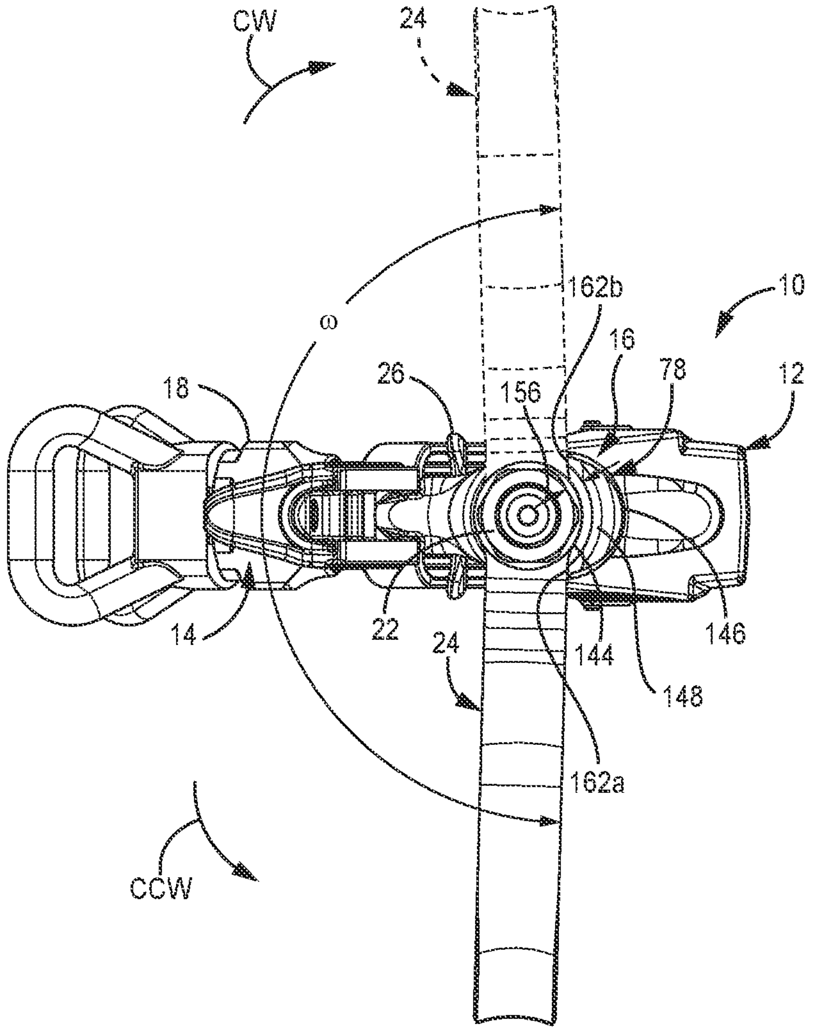
FIG. 4C is a bottom plan view of the spray gun showing the trigger guard positions.
Figure 4D:
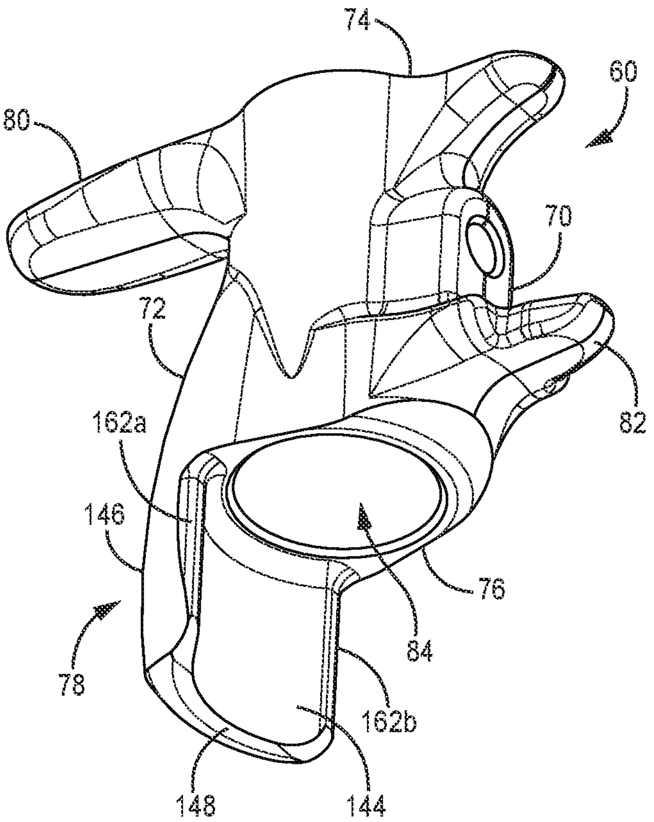
FIG. 4D is an isometric view of an outer portion of a handle.

FIG. 4A is a first partially exploded view of spray gun 10. FIG. 4B is a second partially exploded view of spray gun 10. FIG. 4C is a bottom elevation view of spray gun 10 showing the trigger guard 24 in rotated positions. FIG. 4D is an isometric view of outer portion 60 of handle 16. FIGS. 4A-4D will be discussed together. Gun body 12, trigger 14, handle 16, tip mount 18, tip 20, fitting 22, trigger guard 24, safety 26, pivot mechanism 28, and filter 32 of spray gun 10 are shown. Front end 38, back end 40, back side 48, slot 140, and receiving bore 142 of gun body 12 are shown. Arms 52*a*, 52*b* and pull 56 of trigger 14 are shown. Handle 16 includes inner portion 58, outer portion 60, set screw 62, and connector 64. Outer portion 60 includes front side 70, back side 72, first end 74, second end 76, tail 78, upper projection 80, lower projection 82, and handle bore 84. Tail 78 includes inner side 144, outer side 146, distal end 148, and flats 162*a*, 162*b* (collectively herein "flats 162"). Trigger guard 24 includes upper portion 88, intermediate portion 90, and lower portion 92. Upper portion 88 includes main leg 94 and prong 96. Main leg 94 includes depression 98. Lower portion 92 includes first leg 100, second leg 102, third leg 104, fourth leg 106, fifth leg 108, and ring 110. Contour 112 is defined by first leg 100, second leg 102, and third leg 104. Filter 32 includes filter body 124 and mesh 126.

Handle 16 is removably mounted to gun body 12. Connector 64 is formed at top end 66 of inner portion 58 and interfaces with a feature disposed in receiving bore 142 to connect handle 16 to gun body 12. In the example shown, connector 64 includes male threading and receiving bore 142 includes female threading configured to interface with the male threading, such that handle 16 is connected to gun body 12 by a threaded connection. Filter 32 is disposed within handle 16. Filter body 124 supports mesh 126, which mesh 126 is configured to filter particulate from the paint flowing through handle 16 prior to the paint reaching the valve within gun body 12, such as prior to reaching valve 154 (FIG. 2). Filter 32 is accessed and replaced to prevent clogs from forming in filter 32 and ensure efficient operation of spray gun 10. The user disconnects handle 16 from gun body 12 to access and replace filter 32.

Tail 78 projects from back side 72 of handle 16. Tail 78 extends downward from second end 76 of outer portion 60. Tail 78 extends downwards beyond the location of ring 110 and beyond the lowest point of trigger guard 24. As such, distal end 148 of tail 78 forms the lowest portion of handle 16. Inner side 144 of tail 78 is arcuate and extends partially around fitting 22. Outer side 146 of tail 78 is similarly arcuate. As such, tail 78 can be considered as being arcuate. In some examples, tail 78 is crescent-shaped. In some examples, the crescent shape of tail 78 includes flat ends, such as flats 162*a*, 162*b*. Flats 162*a*, 162*b* are formed at the circumferential ends of tail 78. Flats 162*a*, 162*b* form features configured to interface with trigger guard 24 to facilitate removal of handle 16 from gun body 12 and attachment of handle 16 to gun body 12. While flats 162 are described as flat surfaces, it is understood that flats 162 can be rounded or otherwise contoured to interface with trigger guard 24. Gap 156 is disposed between inner side 144 and fitting 22 such that tail 78 is spaced from fitting 22. The gap 156 provides clearance between the inner side 144 of the tail 78 and the fitting 22 to permit the fitting 22, which has a hex shape, to rotate relative to the handle 16 and the tail 78 to facilitate threading/unthreading of the fitting 22 with a complementary hose fitting and/or from the handle 16 itself. Gap 156 can be configured to have a constant distance such that each portion of inner side 144 tail 78 is spaced about the same distance from fitting 22.

Flats 162*a*, 162*b* extend between and connect inner side 144 and outer side 146. Each of flats 162 has an upper width proximate second end 76 and a lower width proximate distal end 148. In some examples, the upper width is larger than the lower width. Each of flats 162 has a height greater than the largest width of that flat 162. While tail 78 is described as being arcuate, it is understood that tail 78 can be of any suitable configuration for interfacing with trigger guard 24 to torque handle 16. For example, tail 78 can be a post or other projection extending from outer portion 60. Moreover, while tail 78 is described as extending from back side 72, it is understood that tail 78 can project from any desired side of handle 16 to provide the torqueing interface for trigger guard 24. For example, tail 78 can extend from either lateral side of handle 16.

In some examples, tail 78 extends about 175-185 degrees. In one example, the tail 78 extends about 183 degrees. Trigger guard 24 is rotatable about arc ω. In some examples, arc ω is about 175-185 degrees. In one example, arc ω is about 177 degrees. It is understood, however, that arc ω can be of any degree less than 360 degrees. Arc ω is less than 360 degrees to prevent trigger guard 24 from completing a full rotation about handle axis B-B; instead, trigger guard 24 encounters tail 78 to exert torque on handle 16 to facilitate installation and removal of handle 16 from gun body 12, as discussed in more detail below.

An example of removing and replacing filter 32 is discussed in detail. Handle 16 is initially attached to gun body 12 by the interfaced threading between connector 64 and receiving bore 142. Trigger guard 24 is connected to gun body 12 by prong 96 being received in slot 140, and trigger guard 24 is connected to handle 16 by fitting 22 extending through ring 110 and into handle 16. To remove handle 16 from gun body 12, the user initially applies a downward force to main leg 94 of upper portion 88 of trigger guard 24. The downward force causes prong 96 to exit slot 140, at which point the user can rotate trigger guard 24 in either of the clockwise direction CW and the counterclockwise direction CCW. In FIG. 4C, trigger guard 24 is shown rotated fully in the counterclockwise direction CCW and shown in dashed lines rotated fully in the clockwise direction CW.

Ring 110 being connected between fitting 22 and handle 16 with a portion of fitting 22 extending through ring 110 maintains the connection between trigger guard 24 and handle 16 and prevents trigger guard 24 from being fully removed from spray gun 10 without removal of another feature (e.g., removal of fitting 22 from handle 16). Ring 110 is rotatable about fitting 22, facilitating rotation of trigger guard 24 about axis B-B. In the example shown, trigger guard 24 is rotated in the counterclockwise direction CCW to remove handle 16 from gun body 12.

Trigger guard 24 can be rotated relative to handle 16 and is configured to torque handle 16 to drive rotation of handle 16 relative to gun body 12. During removal of handle 16, the user rotates trigger guard 24 until lower portion 92 of trigger guard 24 contacts tail 78. Specifically, trigger guard 24 is rotated in the counterclockwise direction CCW until lower portion 92 contacts flat 162*a* of tail 78 and exerts torque on handle 16 via contact with flat 162*a*. In the example shown, fifth leg 108 of lower portion 92 contacts flat 162*a* of tail 78. The flat lateral side of lower portion 92 interfacing with flat 162*a* provides a larger contact area relative contact between points to distribute the forces exerted on tail 78 by trigger guard 24. The user continues to turn trigger guard 24 in direction CCW and the torque exerted on tail 78 by lower portion 92 causes rotation of handle 16 relative to gun body 12, thereby unthreading connector 64 from receiving bore 142. The user can continue to rotate handle 16 relative to gun body 12 by continuing to exert the rotational force on trigger guard 24. The user continues to rotate handle 16 until handle 16 is unthreaded from gun body 12. The user can then pull handle 16 away from gun body 12, remove the old filter 32, and insert a new filter 32 into handle 16.

With the new filter 32 disposed in handle 16 the user reconnects handle 16 to gun body 12. Top end 66 of inner portion 58 is inserted into receiving bore 142. Trigger guard 24 is rotated in the clockwise direction CW until lower portion 92 contacts flat 162*b* of tail 78. In the example shown, fifth leg 108 of lower portion 92 contacts flat 162*b* of tail 78. The user exerts a rotational force on handle 16 via trigger guard 24 to drive handle 16 clockwise CW about axis B-B and to thread handle 16 into gun body 12. The interfaced threading between connector 64 and receiving bore 142 can be clocked such that handle 16 is at the desired position relative gun body 12 when handle 16 is fully connected to gun body 12. For example, such that upper projection 80 is aligned with the rear projection extending from gun body 12. Handle 16 can be fully threaded onto gun body 12 by trigger guard 24 interfacing with tail 78 to drive rotation of handle 16. With handle 16 connected to gun body 12, filter 32 is installed in spray gun 10. The user can then rotate trigger guard 24 back to an operation position and insert prong 96 into slot 140. For example, the user can depress upper portion 88 and align prong 96 with slot 140. The user then removes the downward force from upper portion 88, such as by removing the user's finger or thumb from depression 98, and the spring force of trigger guard 24 causes prong 96 to enter slot 140. Trigger guard 24 is thus reconnected to gun body 12.

Trigger guard 24 and handle 16 provide significant advantages. Trigger guard 24 provides a lever arm to facilitate removal of handle 16. By utilizing trigger guard 24, the user can exert more force to drive rotation of handle 16 as compared to directly grasping and rotating handle 16. As such, trigger guard 24 facilitates easier and more efficient removal of handle 16 from gun body 12. Trigger guard 24 also eliminates the need to utilize any outside tools to facilitate removal of handle 16. Trigger guard 24 remains connected to handle 16 throughout installation and removal, minimizing the number of lose parts during assembly and disassembly.

Figure 5:
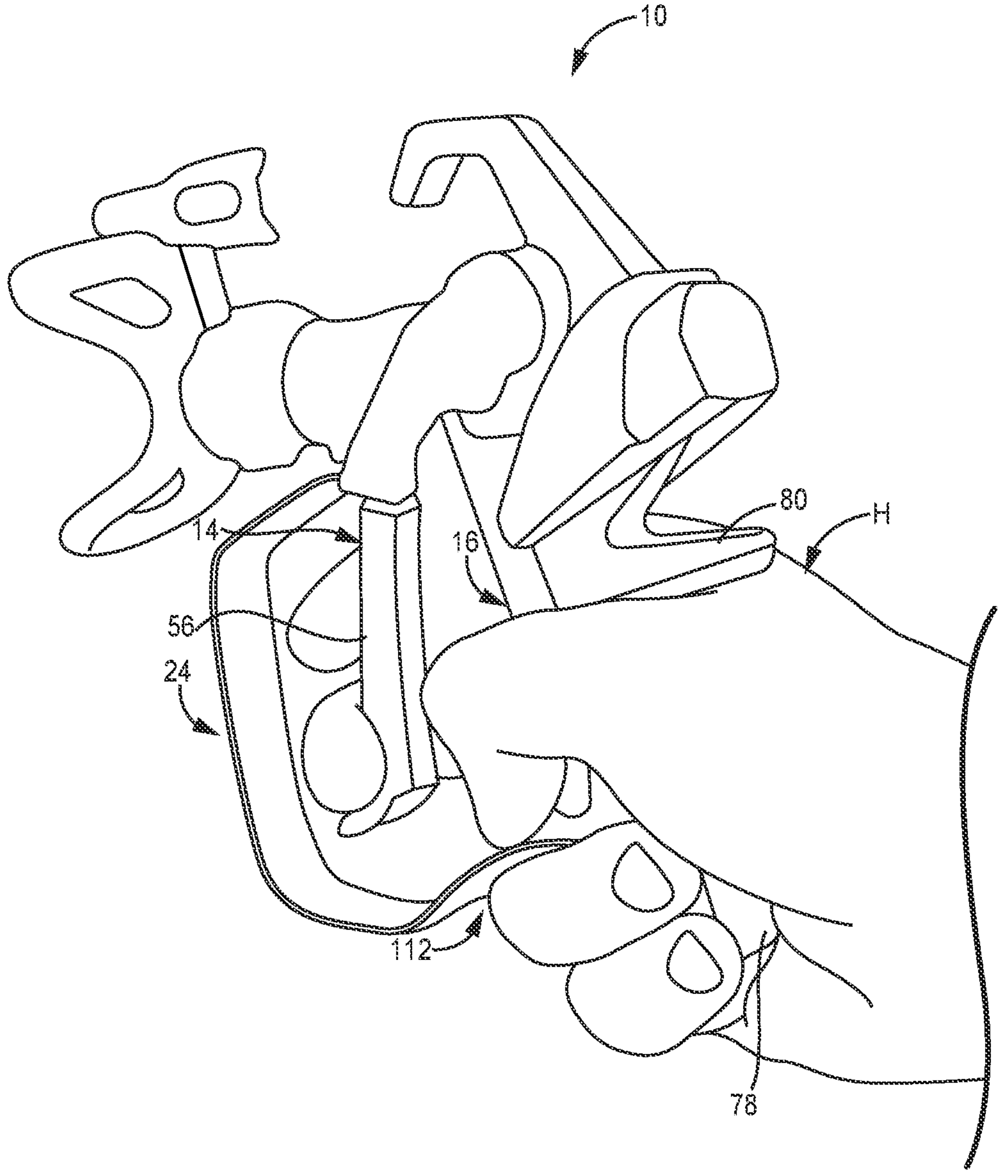
FIG. 5 is an isometric view of a spray gun being grasped by a user.

FIG. 5 is an isometric view showing spray gun 10 being held by a hand H of a user. As shown, the user grasps handle 16 with the user's hand H such that some of the user's fingers are disposed within the area defined between trigger guard 24 and handle 16 and some of the user's fingers are disposed outside of that area. In the example shown, two of the user's fingers are disposed inside the area and interface with pull 56 of trigger 14. The third finger is disposed outside of the area and below trigger guard 24. The third finger extends into contour 112. The third finger is at least partially surrounded by contour 112. The fourth finger is disposed outside of the area and below the third finger. In some examples, contour 112 is sized such that the third finger is disposed in the contour 112 but the fourth finger is not disposed in the contour 112. The user's palm can rest at least partially on back side 72 (FIGS. 1A-4B, 4D) of outer portion 60 (FIGS. 1A-4B, 4D) below upper projection 80 and partially on the exterior surface of tail 78. While FIG. 5 shows the user grasping spray gun 10 with a right hand, it is understood that the user can grasp and manipulate spray gun 10

During operation, the user grasps handle 16 and the user's hand interfaces with trigger guard 24. The user can manipulate and aim spray gun 10 by grasping handle 16. The user can exert force on spray gun to reposition and aim spray gun 10 at the interface between the user's hand and trigger guard 24 at contour 112. Unlike traditional trigger guards, which surround the trigger to prevent inadvertent actuations, trigger guard 24 receives force from the user's hand and is used to manipulate the position of spray gun 10. As such, trigger guard 24 can be considered to form a part of the handle 16 that interfaces with the user's hand and is used to manipulate the spray gun 10 during spraying.

Discussion of Non-Exclusive Embodiments

The following are non-exclusive descriptions of possible embodiments of the present invention.

A spray gun including a gun body; a handle extending from the gun body, the handle having a front side and a rear side; a fitting connected to a lower end of the handle and configured to provide fluid to a flowpath through the handle; and a tail projecting from the lower end of the handle and partially covering the fitting.

The spray gun of the preceding paragraph can optionally include, additionally and/or alternatively, any one or more of the following features, configurations and/or additional components:

The tail extends from a rear side of the handle.

The rear side includes an exterior contour extending onto an exterior surface of the tail.

The tail does not fully wrap around the fitting.

The tail includes an arcuate inner side facing the fitting.

The arcuate inner side extends along an arc between 170-190 degrees, inclusive.

The arc is between 180-185 degrees, inclusive.

The tail is integrally formed with the handle.

The fitting includes a tool interface, and wherein the tail extends below the tool interface such that the tail has a length greater than a length of the tool interface.

The tail extends between a first tail end and a second tail end. The first tail end includes a first flat surface. The second tail end includes a second flat surface.

The first flat surface includes an upper width adjacent the lower end of the handle and a lower width at a distal end of the tail, and wherein the upper width is larger than the lower width.

The tail has a first length, wherein a portion of the handle extending between the gun body and the tail has a second length, and wherein the first length is smaller than the second length.

The second length is at least twice as large as the first length.

A spray gun includers a gun body; a trigger connected to the gun body and configured to actuate a valve to control spraying by the spray gun; a handle extending from the gun body, the handle having a front side and a rear side; and a trigger guard configured to connect to the gun body and the handle, the trigger guard extending about an area within which a pull of the trigger is disposed. The trigger guard is rotatable relative to the handle and the handle includes a portion configured to interface with the trigger guard to prevent the trigger guard from completing a full rotation about the handle. The trigger guard can exert torque on the handle by the interface between the trigger guard and the portion to connect and disconnect the handle from the gun body.

The spray gun of the preceding paragraph can optionally include, additionally and/or alternatively, any one or more of the following features, configurations and/or additional components:

The trigger guard includes an upper portion configured to connect to the gun body and a lower portion configured to connect to the handle.

The lower portion includes a ring at a distal end of the lower portion, the ring connecting the trigger guard to the handle.

A portion of a fitting extends through the ring and into the handle through a lower end of the handle to secure the trigger guard to the handle, the fitting configured to provide fluid to a flowpath through the handle.

The trigger guard includes a leg extending from the ring, the leg configured to interface with the portion of the handle.

A prong extends from upper portion, the gun body including a slot configured to receive the prong.

A spring force exerted by the trigger guard retains the prong within the slot.

The portion includes a tail extending from a lower end of the handle such that a lowest point of the handle is formed by the tail.

The tail extends from a rear side of the handle.

The tail includes an arcuate inner side.

The tail extends between a first tail end and a second tail end, the first tail end includes a first flat surface, and the second tail end includes a second flat surface.

The first flat surface limits rotation of the trigger guard in a counterclockwise direction relative the handle and the second flat surface limits rotation of the trigger guard in a clockwise direction relative the handle.

The first flat surface and the second flat surface limit rotation of the trigger guard to an arc extending between 170-190 degrees, inclusive.

The first flat surface and the second flat surface limit rotation of the trigger guard to an arc extending less than or equal to 180 degrees.

The trigger guard includes an upper portion configured to connect to the gun body and a lower portion connected to the handle, the lower portion configured to interface with the first flat portion and the second flat portion to exert torque on the handle.

The lower portion includes a first leg extending from an intermediate portion of the trigger guard, the intermediate portion extending between and connecting the upper portion and the lower portion; a ring disposed at a distal end of the lower portion, the ring connecting the trigger guard to the handle; a second leg extending from the ring; and a contour disposed between and connecting the first leg and the second leg, the contour configured to receive a finger of the user.

The second leg is configured to interface with the first flat portion and the second flat portion to torque the handle.

The handle is connected to the gun body by interfaced threading, and wherein the trigger guard torques the handle to thread and unthread the handle from the gun body.

A method includes disconnecting a trigger guard from a gun body of a spray gun configured to emit a spray of fluid; rotating the trigger guard in a first rotational direction relative to a handle of the spray gun that the trigger guard is connected to; and exerting torque on the handle by the trigger guard contacting a first portion of the handle to rotate the handle in the first rotational direction relative to the gun body.

The method of the preceding paragraph can optionally include, additionally and/or alternatively, any one or more of the following features, configurations and/or additional components:

Exerting torque on the handle by the trigger guard unthreads the handle from the gun body.

Removing a first filter from the handle with the handle removed from the gun body; inserting a second filter into the handle; and attaching the handle to the gun body.

Attaching the handle to the gun body includes rotating the trigger guard in a second rotational direction opposite the first rotational direction; and exerting torque on the handle by the trigger guard contacting a second portion of the handle to rotate the handle in the second rotational direction relative to the gun body. Rotating the handle in the second rotational direction connects the handle to the gun body.

The handle is connected to the gun body by interfaced threading.

Inserting a prong extending from the trigger guard into a slot formed in the gun body to connect the trigger guard to the gun body.

A spray gun includes a gun body; a trigger connected to the gun body and configured to actuate a valve to control spraying by the spray gun; a handle extending from the gun body, the handle having a front side and a rear side; and a trigger guard extending between and connected to the gun body and the handle. The gun body, the handle, and the trigger guard define an area within which a pull of the trigger is disposed. The trigger guard includes a contour disposed proximate the handle, the contour configured to receive at least one finger of the user disposed outside of the area.

The spray gun of the preceding paragraph can optionally include, additionally and/or alternatively, any one or more of the following features, configurations and/or additional components:

The contour comprises a first leg along which the trigger guard bends upwards toward the trigger, a third leg along which the trigger guard bends downwards away from the trigger, and a second leg joining the first leg and the third leg, wherein the first leg, the second leg, and the third leg are located below the trigger such that the contour projects upwards toward the trigger.

The first leg is longer than either of the second leg and the third leg.

The trigger guard includes an upper portion connected to the gun body; a lower portion secured to the handle; and an intermediate portion extending between and connecting the upper portion and the lower portion. The contour is formed in the lower portion.

The contour includes a first leg; a second leg extending from the first leg; and a third leg extending from the second leg.

The lower portion further includes a fourth leg extending from the intermediate portion to the first leg; and a fifth leg extending from the third leg to a portion of the lower portion secured to the handle.

The portion of the lower portion secured to the handle comprises a ring, the ring secured to the handle by a fitting extending through the ring and into the handle.

The contour projects into the area.

The first leg has a first length, the second leg has a second length, and the third leg has a third length, and wherein the first length is greater than the second length and greater than the third length.

The first length is greater than a sum of the second length and the third length.

Each of the first leg, the second leg, and the third leg extend transverse to an axis through the handle.

The first leg is disposed transverse to each of the second leg and the third leg.

The second leg is disposed transverse to the third leg.

A first portion of the contour is disposed above a bottom edge of the handle and a second portion of the contour is disposed below the bottom edge of the handle.

A tail extending downward from a rear side of the handle, the tail at least partially covering a fitting connected to a lower end of the handle. The contour is disposed on an opposite side of the fitting from the tail.

A distal end of the tail is disposed a first axial distance, along an axis through the handle, from the bottom edge, wherein a low point of the contour is disposed a second axial distance from the bottom edge, and wherein the first distance is larger than the second distance.

The handle has a first height and the tail has a second height, and wherein the first height is larger than the second height.

The first height is at least twice as large as the second height.

The pull is configured to be contacted by two fingers of the user while the other two fingers of the user are disposed outside of the area.

A method of spraying with a spray gun having a gun body, a trigger configured to control spraying by the spray gun, a handle extending from the gun body, and a trigger guard extending between the gun body and the handle, the method including grasping the handle of the spray gun such that a first finger interfacing with the trigger is disposed in an area between the trigger guard and the handle and a second finger is disposed outside of the area; manipulating an orientation of the spray gun by exerting a force on the trigger guard by the second finger interfacing with the trigger guard; and actuating the trigger with the first finger to cause spraying by the spray gun.

A spray gun having a handle and a fitting that connects with the handle to route fluid through the handle for spraying, the handle having a tail portion that covers only a portion about a circumference of the fitting.

A spray gun having a handle, a trigger, and a guard, the handle and the guard defining a trigger area, the guard having a bend which accommodates at least part of an operator's finger outside of the trigger area while at least one other finger of the operator is within the trigger area.

A spray gun having a handle, a gun body, and a guard, the guard rotatable relative to the handle for a limited range, the guard engaging a stop surface of the handle during rotation such that the guard torques and rotates the handle to unthread the handle from the gun body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray gun comprising:

a gun body;

a handle extending from the gun body, the handle having a front side and a rear side and extending along an axis;

a fitting connected to a lower end of the handle and configured to provide fluid to a flowpath through the handle, wherein the fitting extends into the handle and includes a portion disposed outside of the handle, the portion formed on a radially outer side of the fitting and configured to interface with a tool to engage the tool and facilitate installation and removal of the fitting; and a tail projecting from the lower end of the handle and wrapping partially around the axis, the tail partially covering the fitting by the tail wrapping partially around the axis such that a radially exterior side of the portion of the fitting is partially covered by the tail with the fitting connected to the handle and partially exposed with the fitting connected to the handle, wherein the tail extends below the portion of the fitting.

2. The spray gun of claim 1, wherein the tail extends from a rear side of the handle.

3. The spray gun of claim 2, wherein the rear side includes an exterior contour extending onto an exterior surface of the tail.

4. The spray gun of claim 1, wherein the tail includes an arcuate inner side facing the fitting.

5. The spray gun of claim 4, wherein the arcuate inner side extends along an arc between 170-190 degrees, inclusive.

6. The spray gun of claim 1, wherein the tail is integrally formed with the handle.

7. The spray gun of claim 1, wherein the tail extends below the portion of the fitting such that the tail has a length greater than a length of the tool interface.

8. The spray gun of claim 1, wherein:

the tail extends between a first tail end and a second tail end;

the first tail end includes a first flat surface; and the second tail end includes a second flat surface.

9. The spray gun of claim 8, wherein the first flat surface includes an upper width adjacent the lower end of the handle and a lower width at a distal end of the tail, and wherein the upper width is larger than the lower width.

10. The spray gun of claim 1, wherein the tail has a first length, wherein a portion of the handle extending between the gun body and the tail has a second length, and wherein the first length is smaller than the second length.

11. The spray gun of claim 10, wherein the second length is at least twice as large as the first length.

12. The spray gun of claim 1, further comprising:

a trigger connected to the gun body and configured to actuate a valve to control spraying by the spray gun;

a trigger guard extending between the gun body and the handle and about an area within which a pull of the trigger is disposed;

wherein the trigger guard is rotatable relative to the handle and is configured to interface with the tail such that the tail prevents the trigger guard from completing a full rotation about the handle, and wherein the trigger guard can exert torque on the handle by the interface between the trigger guard and the tail to connect and disconnect the handle from the gun body.

13. The spray gun of claim 12, wherein the trigger guard includes an upper portion configured to connect the trigger guard to the gun body and a lower portion configured to connect the trigger guard to the handle.

14. The spray gun of claim 13, wherein the lower portion includes a ring at a distal end of the lower portion and wherein a portion of the fitting extends through the ring and into the handle through a lower end of the handle to secure the trigger guard to the handle.

15. The spray gun of claim 14, wherein the trigger guard includes a leg extending from the ring, wherein the leg is configured to interface with the portion of the handle, wherein a prong extends from upper portion, wherein the gun body including a slot configured to receive the prong, and wherein a spring force exerted by the trigger guard retains the prong within the slot.

16. The spray gun of claim 12, wherein a lowest point of the handle is formed by the tail.

17. A spray gun comprising:

a gun body;

a handle extending from the gun body, the handle having a front side and a rear side;

a trigger connected to the gun body and configured to actuate a valve to control spraying by the spray gun;

a trigger guard extending between the gun body and the handle and about an area within which a pull of the trigger is disposed;

a fitting connected to a lower end of the handle and configured to provide fluid to a flowpath through the handle, wherein the fitting extends into the handle and includes a portion disposed outside of the handle, the portion configured to interface with a tool to engage the tool and facilitate installation and removal of the fitting; and a tail projecting from the lower end of the handle, and partially covering the fitting such that a side of the portion of the fitting is partially covered by the tail and partially exposed;

wherein the trigger guard is rotatable relative to the handle and is configured to interface with the tail such that the tail prevents the trigger guard from completing a full rotation about the handle, and wherein the trigger guard can exert torque on the handle by the interface between the trigger guard and the tail to connect and disconnect the handle from the gun body; and wherein the tail extends between a first tail end and a second tail end, the first tail end includes a first flat surface, the second tail end includes a second flat surface, the first flat surface limits rotation of the trigger guard in a first rotational direction about the handle, and the second flat surface limits rotation of the trigger guard in a second rotational direction relative the handle, the second rotational direction opposite the first rotational direction.

18. A spray gun comprising:

a gun body;

a handle extending from the gun body, the handle having a front side and a rear side;

a trigger connected to the gun body and configured to actuate a valve to control spraying by the spray gun;

a trigger guard extending between the gun body and the handle and about an area within which a pull of the trigger is disposed;

a fitting connected to a lower end of the handle and configured to provide fluid to a flowpath through the handle, wherein the fitting extends into the handle and includes a portion disposed outside of the handle, the portion configured to interface with a tool to engage the tool and facilitate installation and removal of the fitting; and a tail projecting from the lower end of the handle, and partially covering the fitting such that a side of the portion of the fitting is partially covered by the tail and partially exposed;

wherein the trigger guard is rotatable relative to the handle and is configured to interface with the tail such that the tail prevents the trigger guard from completing a full rotation about the handle, and wherein the trigger guard can exert torque on the handle by the interface between the trigger guard and the tail to connect and disconnect the handle from the gun body; and wherein the handle is connected to the gun body by interfaced threading, and wherein the trigger guard torques the handle to thread and unthread the handle from the gun body.

19. A spray gun comprising:

a gun body;

a trigger connected to the gun body and configured to actuate a valve to control spraying by the spray gun;

a handle extending from the gun body, the handle having a front side and a rear side;

a trigger guard configured to connect to the gun body and the handle, the trigger guard extending about an area within which a pull of the trigger is disposed;

a fitting connected to a lower end of the handle and configured to provide fluid to a flowpath through the handle, wherein the fitting extends along an axis and into the handle and the fitting includes a portion formed on a radial exterior of the fitting and disposed outside of the handle and below a lower end of the trigger guard, the portion configured to interface with a tool to engage the tool and facilitate rotation of the fitting for installation and removal of the fitting; and a tail integrally formed with the handle, projecting from the lower end of the handle, and partially wrapped around the fitting such that the tail is partially covering the portion of the fitting, such that a radially exterior side of the portion of the fitting is partially covered by the tail with the fitting connected to the handle and such that the radially exterior side of the portion of the fitting is partially exposed with the fitting connected to the handle.

20. The spray gun of claim 19, wherein:

the trigger guard is rotatable relative to the handle and the tail is configured to prevent the trigger guard from completing a full rotation about the handle, and wherein the trigger guard can exert torque on the handle by the interface between the trigger guard and the tail to connect and disconnect the handle from the gun body; and the tail extends between a first tail end and a second tail end, the first tail end includes a first flat surface, the second tail end includes a second flat surface, the first flat surface limits rotation of the trigger guard in a first rotational direction about the handle and the second flat surface limits rotation of the trigger guard in a second rotational direction about the handle.

* * * * *